United States Patent
Yoshimizu et al.

[19]

[11] Patent Number: 5,931,039

[45] Date of Patent: Aug. 3, 1999

[54] ELECTRICAL BAR CUTTING AND BENDING TOOL

[75] Inventors: Chikai Yoshimizu; Kihatirou Matsumoto; Junichi Konishi; Hiroyuki Oda; Nobuaki Hatanaka, all of Hitachinaka, Japan

[73] Assignee: Hitachi Koki Co., Ltd., Tokyo, Japan

[21] Appl. No.: 08/827,908

[22] Filed: Apr. 7, 1997

[30] Foreign Application Priority Data

Apr. 10, 1996 [JP] Japan ................................. P8-088016
Dec. 9, 1996 [JP] Japan ................................. P8-328144

[51] Int. Cl.[6] .................................................. B21D 7/024
[52] U.S. Cl. .................................. 72/217; 72/387; 83/602
[58] Field of Search ............................... 72/217, 218, 294, 72/307, 321, 387, 388; 83/602, 674; 30/228, 245, 247, 249

[56] References Cited

U.S. PATENT DOCUMENTS

| | | | |
|---|---|---|---|
| 4,052,875 | 10/1977 | Sakamoto | 72/217 |
| 4,223,543 | 9/1980 | Sakamoto | 72/217 |
| 5,044,188 | 9/1991 | Nonaka | 72/217 |
| 5,203,192 | 4/1993 | Kimura | 72/217 |
| 5,284,040 | 2/1994 | Beelen et al. | 72/217 |

FOREIGN PATENT DOCUMENTS

| | | | |
|---|---|---|---|
| 1221908 | 6/1960 | France | 72/218 |
| 56-144826 | 11/1981 | Japan . | |
| 2-8810 | 2/1990 | Japan . | |
| 4-38527 | 6/1992 | Japan . | |
| 5-12033 | 2/1993 | Japan . | |
| 6-39445 | 2/1994 | Japan | 72/217 |
| 683864 | 9/1979 | U.S.S.R. | 83/602 |

*Primary Examiner*—David Jones
*Attorney, Agent, or Firm*—Sughrue, Mion, Zinn, Macpeak & Seas, PLLC

[57] ABSTRACT

An electric cutting and bending tool that transfers the rotation of an electric motor to an output shaft after slowing the rotation through a gear train. An eccentric cam is provided integrally with the output shaft and drives against a pivot plate. The pivot shaft has one end provided with a cam roller in rolling contact with the cam, another end provided with a movable blade and an intermediate portion provided with a pivot pin. A bending roller is provided on the cam to bend a reinforcing rod about a center pin to a desired angle between 0–180°.

28 Claims, 24 Drawing Sheets

ELECTRICAL BAR CUTTING AND BENDING TOOL

BACKGROUND OF THE INVENTION

The present invention relates to an electrical bar cutting tool, an electrical bar bending tool, and an electrical bar cutting and bending tool. The electrical bar cutting tool or bar cutter is used for cutting an elongated member such as a steel rod and a metal pipe, and the electrical bar bending tool or bar bender is used for bending the elongated member. Further, the electrical bar cutting and bending tool or a bar cutter/bender is used for selectively cutting or bending the elongated member.

A portable electric cutting and bending tool is capable of cutting to a desired length or bending an elongated rod such as steel rods or pipes used in the construction of houses or buildings, in engineering work, and the like. The following descriptions use the example of reinforcing rods as the object to be cut or bent.

A large amount of reinforcing rods are used to reinforce concrete in house and building foundations, block walls, and structures used in engineering work. Reinforcing rods have fixed standard diameters of 10, 13, 16, 19, and 22 mm and are generally sold at a fixed length of 5 meters.

FIG. 34 shows the variety of patterns in which reinforcing rods 70 are cut and bent for use in the foundation of a house. These rods are cut to specified lengths, bent to specified angles, and assembled together with binding wires 74 according to construction blueprints. For example, a reinforcing rod 72 with a diameter of 10 mm is cut to a length of about 1 m and bent into an L-shape at 90°, and a reinforcing rod 73 with a diameter of 13 mm is cut to a length of about 1.2 m, after which the top end is bent into a U-shape at 180°. A tool is needed for cutting these reinforcing rods to desired lengths and bending them to desired angles between 45 and 180°.

Conventionally, manufacturers of the rods cut and bend hundreds to thousands of the reinforcing rods at one time using a large machine built specially for such work. The manufacturers then supply these rods to the builders. However, it can be quite expensive to hire the services of these manufacturers when using a comparatively low 200–400 rods per day, for example when making additions or modifications at the construction site of an ordinary house, outer structure, or building. If there is a lot of processing work at the construction site, it may be necessary to cut and bend reinforcing rods on the site in order to conform to the actual situation. In this case, cutting and bending must be accomplished with a cutting and bending tool as described in Japanese Patent Application Kokai (OPI) No. SHO-56-144826.

In the bar cutter/bender disclosed in the Japanese reference, an output shaft extends in a housing and is driven by a drive motor through a speed reduction gear mechanism. An eccentric cam is provided integrally with the output shaft at an intermediate portion of the output shaft and inside the housing. A slide piece is provided movable in a direction perpendicular to the output shaft. One end of the slide piece is provided with a cam roller in contact with the cam surface of the eccentric cam, and another end of the slide piece is provided with a movable blade. Upon rotation of the output shaft, the slide piece is moved by the eccentric cam, so that the movable blade is moved toward a stationary blade to cut the elongated member.

Further, an end portion of the output shaft protrudes from the housing, and a crank-shaped pivot plate provided with a bending roller is connected to the output shaft. Further, a center roller is coaxially provided with the protruded part of the output shaft. Therefore, the bending roller is moved along an arcuate path about the center roller upon rotation of the output shaft. The elongated member such as a steel rod is bent at a position around the center roller by the urging force of the bending roller.

However, the cutting and bending tool disclosed in the JP reference is disadvantageous in portability, size, weight and production cost. More specifically, a large cutting force is required to cut reinforcing rods. For example, 56,000 N of force is required to cut a reinforcing rod having a diameter of 13 mm. However, the slide piece does not provide a power boosting function. Therefore, the pushing force of the eccentric cam on the cam roller of the slide piece must be 56,000 N, requiring the output shaft and the eccentric cam supported thereby to be very large and heavy in order to support such force. As a result, the gear train and electric motor will also have to be large to drive the heavy output shaft and eccentric cam.

Further, the eccentric cam is exclusively used for cutting, and the pivot plate is exclusively used for bending, and these are positioned spaced away from each other. Therefore, these components must be respectively manufactured and assembled. These many parts will not only make the overall tool heavy, but will require the output shaft to be longer in accordance with the provision of the eccentric cam at the intermediate portion of the output shaft. As a result, the tool will be too large to be appropriate as a portable tool, and production cost is greatly increased.

A manually operated bar bender is also known. Even though manual operation requires operator's force, delicate and adjustive bending can be performed while observing the bending state of the bar. In contrast, a conventional electrically operated bar bender cannot perform an adjusted bending operation due to rapid bending.

A hydraulically operated bar cutter is also known. Generally, the hydraulic bar cutter requires a great number of oils to be supplied into a cylinder, and long moving stroke results, to prolong the operation period.

A Japanese Patent Application Kokai (OPI) No. Hei 4-262824 discloses a steel bar bender as shown in FIG. 35. A steel bar bending operation is performed on a top plate 205, and a bending roller 214 and a center pin 204 are provided at a position above the top plate 205. An electric motor is disposed immediately below a top plate 205. Rotation of the electric motor is transmitted to an output shaft through a gear train. Because the electric motor has a relatively large mass, the top plate 205 is positioned at a relatively high position, where the bending operation is performed.

With this arrangement, the steel bar 226 is pressed by the bending roller 214 and is bent around the center pin 204. If a relatively long steel bar 226 is to be bent, the steel bar 226 must be held by hand such that the steel bar 226 can be contacted with the bending roller 214 and the center pin 204. Further, the height of the steel bar bender is primarily dependent on the size of the electric motor. Therefore, it may be difficult to provide a compact steel bar bender.

FIGS. 36 and 37 show still another conventional steel bar bender. On a top plate 205, a center pin 227 serving as a fulcrum for bending the steel bar and a separate counteraction receiving member 228 are provided. The center pin 227 is fixedly secured to the top plate 205 by a key 229 and a bolt (not shown) in order to stably maintain its position so as not to be moved by the bending steel bar pushed by the movable bending roller 214. With this arrangement, the center pin 227 and the counteraction receiving member 228 must be independently produced and then assembled to the top plate 205, thereby rendering the entire structure intricate. Further, the top plate 205 must be formed of thick steel plate since the top plate 205 must provide sufficient strength capable of sustaining a bending force applied to the center pin 227. As a result, the steel bar bender becomes heavy.

In another aspect, the bar cutter or bar bender is used at an outdoor building site, and a great amount of scales are peeled off from the steel bar 226 during bending operation. Therefore, a dust proof arrangement is required so as to prevent the scales from entering into mechanically engaging portions or an electric motor, to prolong the service life of the bar cutter/bender. However, a dust proof structure has not yet been proposed in this field.

In still another aspect, FIG. 38 shows a conventional bar cutter/bender of a portable and ground set type. The bar cutter/bender provides a change-over switch for changing the bending operation and cutting operation from each other. A cutter portion 231 is exposed at the side surface of a housing. Therefore, if a bending operation is to be performed in spite of the cutting mode, the cutter portion 231 is activated, so that the cutter portion 231 inadvertently bites foreign objects, since the cutter portion is also driven during the bending operation mode.

Further, FIG. 39 shows another conventional steel bar cutter/bender, in which a protective cover 232 is provided so as to cover a cutter portion 231 in case of the bending mode or transportation. However, if an operator forgets the closure of the protective cover 232, the cutter portion 231 may bite the foreign objects during bending operation mode.

In still another aspect, in the conventional steel bar cutter/benders shown in FIGS. 38 and 39, if an elongated steel bar such as the bar having a length of 5 m is to be cut, shaking may occur in the entire device when the heavy steel bar is set on the device or displaced for adjusting the cutting position. Therefore, a stabilized cutting operation may not be performed. A Japanese Patent publication (Kokoku) No. Hei 2-8810 discloses a bar cutter/bender similar to the type shown in FIG. 39.

Further, a Japanese Utility Model Application Kokai (OPI) No. Hei 5-12033 and a commonly assigned copending U.S. patent application Ser. No. 08/429,551 (corresponding to a German Patent Application No. 195 15 955.1) disclose a driving mechanism using a cam for driving a movable blade in a screw bar cutter.

Further, a Japanese Patent Publication (Kokoku) No. Hei 4-38527 discloses a bar cutter/bender. In the bar cutter/bender, a main body is provided with a center roller around which the bar is bent, and a stationary blade. A pivot arm is pivotally supported to the main body. The pivot arm has an intermediate portion provided with a movable blade and a free end portion provided with a bending roller. The pivot arm is connected to a piston, so that the pivot arm is pivotally movable about a pivot shaft mounted on the main body.

SUMMARY OF THE INVENTION

It is therefore, an object of the present invention to overcome the above-described conventional drawbacks and disadvantages and to provide an improved portable electrical bar cutting and bending tool suitable for cutting and bending operations at the job site.

Another object of the present invention is to provide such a tool capable of reducing driving power or torque for driving the output shaft, gears, the electric motor, and the cam driven thereby, while retaining the same cutting force in order to reduce the size of the tool.

Still another object of the invention is to provide such a tool in which relatively expensive mechanical components such as the eccentric cam and the pivot plate can be effectively used for providing a compact and low cost tool.

Still another object of the invention is to provide such a tool having an improved eccentric cam, whose cam contour can generate a large force by a relatively small driving torque from the output shaft in order to decrease the size and weight of the gears, electric motor, and, as a result, the overall body of the tool.

Still another object of the invention is to provide such an electric tool capable of adjusting the speed of the bending operation while viewing the bending state of the rod.

Still another object of the invention is to provide such a tool capable of being lifted and positioned at the desired operating position with a switch that can be easily manipulated while the user is supporting the tool at the desired position in order to perform additional processing on reinforcing rods that have already been assembled at the construction site.

Still another object of the present invention is to provide the cutting and bending tool capable of setting the reinforcing rod laying lengthwise on the ground rather than requiring the reinforcing rods to be stood up vertically or swung around, which would require additional work for the user.

Still another object of the invention is to provide such a tool in which the end of the reinforcing rod bent from 0–180 degrees by the tool does not come in contact with the user when the bending operation is performed with gripping the tool by operator's hand. That is, the conventional stationary bending tools are heavy and stable, and do not require the user to hand-grip the body of the tool. However, in order to solve the problems above for constructing a tool light and small enough for the user to support, a method for supporting the body of the tool is necessary. Therefore, the user must grip a handle and operate a switch on the tool with one hand, while placing the reinforcing rod on the tool with the other hand. For this reason, the tool must be designed so that the end of the reinforcing rod being bent from 0–180 degrees does not come in contact with the user.

Still another object of the present invention is to provide such a bending tool in which over-rotation of the output shaft can be avoided so as to avoid excessive bending of the reinforcing rod to more than 180 degrees. That is, the output shaft must return to its initial rotating position after rotating to the specified angle set by the user. However, if an unforeseen problem, such as a malfunction of a limit switch that determines the maximum rotating position, occurs, the tool must be capable of preventing the reinforcing rod from being bent past 180 degrees to the point of becoming unusable, as well as preventing damage to the tool itself.

Still another object of the present invention is to provide a compact bar cutting or bending tool in which a top plate is positioned at a low level so that an elongated steel bar can be set without lifting the steel bar at a high position.

Still another object of the present invention is to provide the bar cutting or bending tool having an improved dust proof arrangement.

Still another object of the present invention is to provide the bar cutting and bending tool having a safety arrangement in which a blade portion can be automatically protected in the bending operation mode, and the rod cannot be set at a predetermined position for bending in the cutting operation mode.

Still another object of the present invention is to provide the bar cutting and bending tool capable of reducing the load applied to a center pin, bending pin and a pivot shaft.

Still another object of the present invention is to provide the bar cutting and bending tool providing a stabilized posture during operation mode without shaking.

These and other objects of the present invention will be attained by providing an electrically driven bar cutting and bending tool for selectively cutting or bending an elongated member, the tool including a main body having an open end, an electric motor housed in the main body, a speed reduction gear train, a fixing member, an output shaft, a cam, a pivot arm, a movable blade, a stationary blade, a center pin, and a bending pin. The speed reduction gear train is housed in the main body for deceleratingly transmitting rotation of the electric motor. The fixing member is fixed to the open end of the main body. The output shaft is rotatably supported by the fixing member and extends in the main body and is connected to the speed reduction gear train. The output shaft has one end. The cam is provided to the output shaft and is rotatable together with the rotation of the output shaft. The pivot arm is pivotally supported to the fixing member. The pivot arm has one end provided with a cam roller in contact with the cam, another end provided with the movable blade, and an intermediate portion provided with a pivot shaft fixed to the fixing member. The pivot arm is pivotally moved about an axis of the pivot shaft. The stationary blade is fixed to the fixing member at a position confrontable with the movable blade for cutting the elongated member. The center pin is coaxially provided to the one end of the output shaft. The bending pin is provided to the cam at a position away from the center pin so that the bending pin is moved about an axis of the center pin during rotation of the cam for bending the elongated member around the center pin.

In another aspect of the invention, there is provided an electrically driven bar bending tool for bending an elongated member including the main body, the electric motor, the speed reduction gear train, the fixing member, the output shaft, the cam, the center pin, and the bending pin. The bending pin is moved about an axis of the center pin during rotation of the cam for bending the elongated member around the center pin.

In still another aspect of the invention, there is provided an electrically driven bar cutting tool for cutting an elongated member including the main body, the electric motor, the speed reduction gear train, the fixing member, the output shaft, the cam, the pivot arm, the movable blade, the stationary blade for cutting the elongated member when the movable blade is moved to a cutting direction. The cam has a rotation center and a cam surface, and includes a fast-forward section in which a radius between the rotation center and the cam surface is rapidly increased, and a cutting section in which a radius between the rotation center and the cam surface is gradually increased.

In still another aspect of the invention, there is provided an electrically driven bar bending tool for bending a bar including an electric motor having a rotation shaft, a gear cover having an upper open end, a speed reduction gear train, a top plate, an output shaft, a center pin, a bending pin, and a housing. The speed reduction gear train is connected to the rotation shaft and is housed in the gear cover for decelerating rotation of the rotation shaft. The top plate is positioned to cover the upper open end of the gear cover. The output shaft extends through the gear cover and is connected to the speed reduction gear train. The center pin is provided at a position above the top plate. The bar is bent around the center pin. The bending pin is driven by the output shaft and has an upper portion extending through and projecting from the top plate. The bending pin is movable about the center pin. The bar is mounted on the top plate and is bent by the movement of the bending pin around the center pin. The housing is positioned beside the top plate for exclusively housing the electric motor so as to reduce a height of the top plate. The rotation shaft has a lower end connected to the speed reduction gear train.

In still another aspect of the invention, there is provided an electrically driven bar bending tool for bending a bar including the electric motor, the gear cover, the speed reduction gear train, the top plate formed with a slot, the output shaft, the center pin, the bending pin, and a disc plate. The bending pin is driven by the output shaft and has an upper portion extending through the slot and projecting from the top plate. The bending pin is movable about the center pin, and the bar is mounted on the top plate and is bent by the movement of the bending pin along the slot. The disc plate is positioned above the top plate and covers the slot. The disc plate is provided rotatably in accordance with the movement of the bending pin.

In still another aspect of the invention, there is provided an electrically driven bar cutting and bending tool for selectively cutting a bar or bending the bar including the electric motor, the gear cover, the speed reduction gear train, the top plate, the output shaft, a cam rotatably driven by the output shaft, the center pin, a bending pin, a fixing member, a stationary blade, a movable blade, and a housing. The bending pin is driven by the cam and has an upper portion extending through and projecting from the top plate. The bending pin is movable about the center pin, and the bar is mounted on the top plate and is bent by the movement of the bending pin around the center pin. The fixing member is disposed in and fixed to the gear cover. The stationary blade is fixed to the fixing member. The movable blade is driven by the cam and is movable toward and away from the stationary blade for cutting the bar. The housing is positioned beside the top plate for exclusively housing the electric motor. The rotation shaft has a lower end connected to the speed reduction gear train.

In still another aspect of the invention, there is provided an electrically driven bar cutting and bending tool for selectively cutting a bar or bending the bar including an electric motor, a cutting portion, a bending portion, a protection cover, a blocking member and an interlocking mechanism. The cutting portion includes a stationary blade and movable blade movable toward and away from the stationary blade for cutting the bar. The movable blade is driven by the electric motor. The bending portion includes a top plate, a center pin, and a bending pin. The top plate defines a rod extending passage on which the rod is installed for bending the rod. The center pin is provided at the top plate, and the bar is bent around the center pin. The bending pin is driven by the electric motor and has an upper portion extending through and projecting from the top plate. The bending pin is movable about the center pin. The rod extending passage is positioned between the center pin and the upper portion of the bending pin. The protection cover is movable between a protecting position for covering the cutting portion and an exposing position for exposing the cutting position. The blocking member is movable between a blocking position for blocking the rod extending passage and an open position for opening the rod extending passage. The interlocking mechanism is adapted for moving the protection cover to the protecting position when the blocking member is moved to the open position and for moving the protection cover to the exposing position when the blocking member is moved to the blocking position.

DETAILED DESCRIPTION OF THE PREFERRED EMBODIMENT

An electric cutting and bending tool according to a first embodiment of the present invention will be described with reference to FIGS. 1 through 21.

Figure 1:
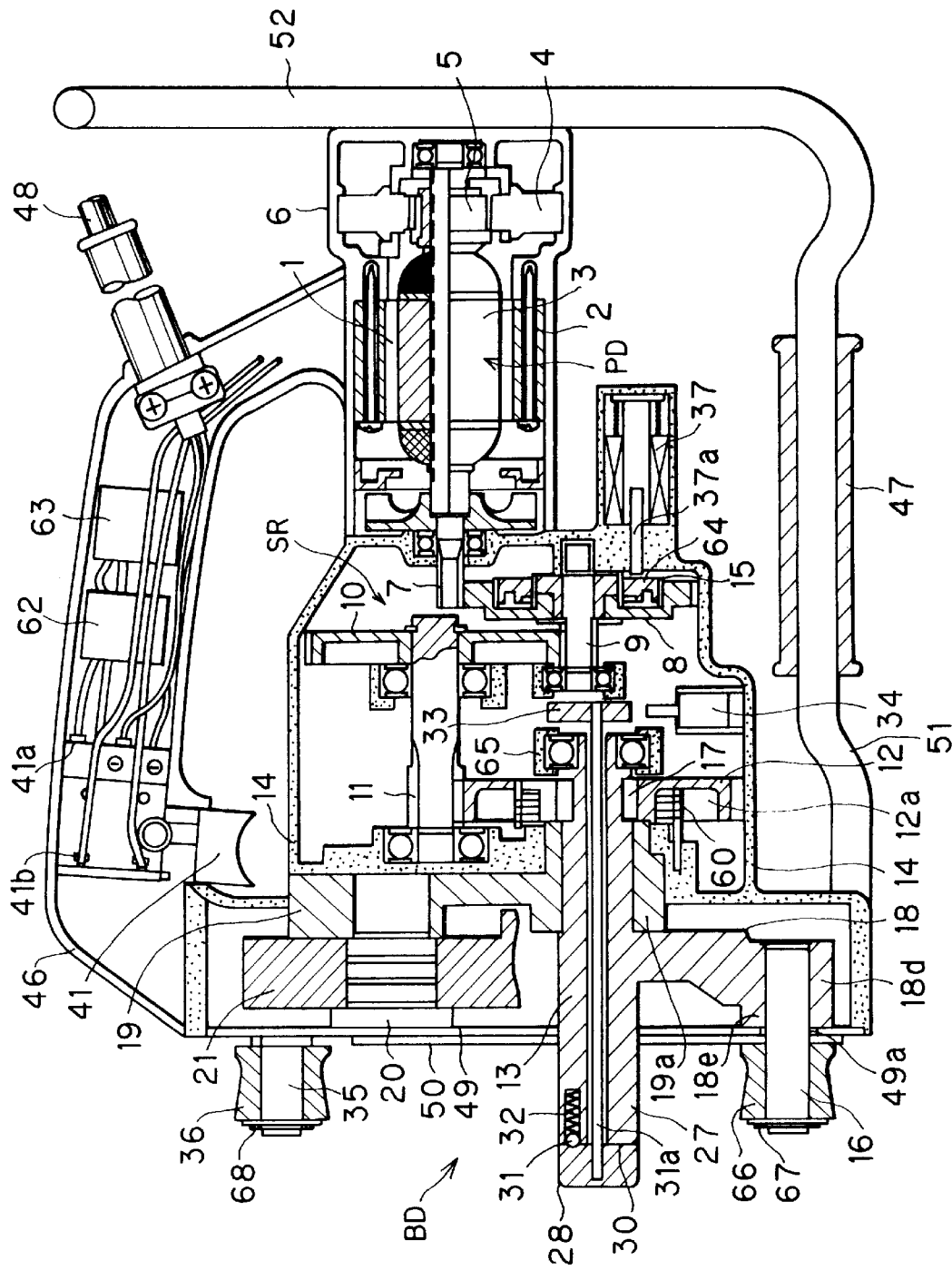
FIG. 1 is a cross-sectional view showing an electric cutting and bending tool according to one embodiment of the present invention.

As shown in FIG. 1, a main body includes a housing 6 and a gear cover 14 connected to the housing 6, and a handle 46 is provided bridging between the housing 6 and the gear cover 14. The housing 6 is made of a resin and houses therein a series-wound motor 1 having a motor shaft. The gear cover 14 is an aluminum alloy die-casting product and houses therein a speed reduction mechanism SR or a decelerating mechanism. The handle 46 extends substantially parallel with the motor shaft, and a main switch or a speed control switch having a trigger 41 is provided to the handle 46. The handle 46 is made of a resin for carrying the entire tool and for manipulating the main switch 41. The handle 46 is of a hollow structure provided by complementary halves within which are stored a part of the main switch 41, a normally-closed contact relay 62, and a timer circuit 63. The trigger operation of the main switch 41 can be made while supporting the main body by the handle 46. An electric cord 48 comes out of the handle 46 at the housing 6 side, opposite the gear cover 14 side, so as to not be in the way of cutting and bending operations described later.

Figure 2:
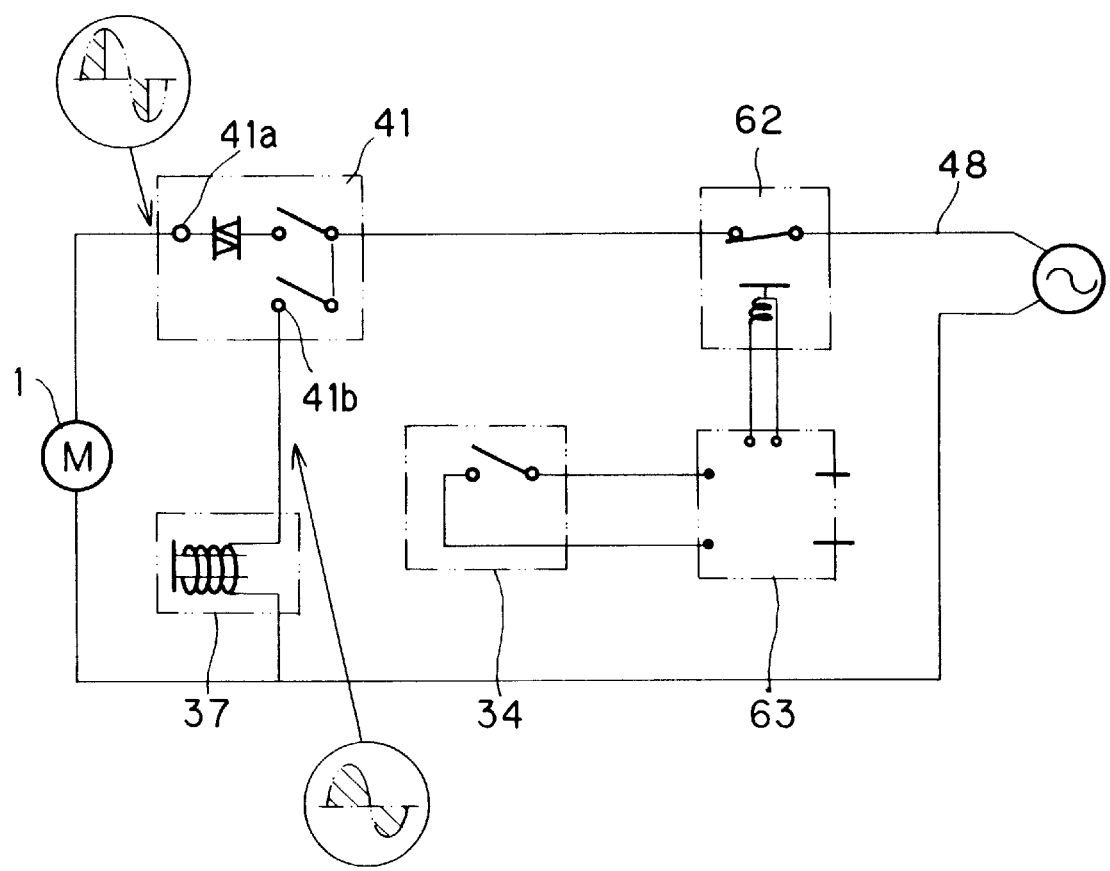
FIG. 2 is a circuitry diagram showing electrical connections in the cutting and bending tool of the first embodiment.

In FIG. 2 a circuitry diagram for the cutting and bending tool is shown. A commercial 100V AC power source is supplied through the electric cord 48. The power source supplies a current to the electric motor 1 through the normally-closed contact relay 62, and the main switch 41. The main switch 41 provides a speed control function for changing the rotating speed of the electric motor 1 according to the amount of pull on the trigger. A solenoid coil 37 is connected in parallel to the electric motor 1 and turns ON and OFF according to manipulations of the main switch 41. The electric motor 1 is connected to a phase control terminal 41*a* that controls the phase for controlling the electric power supply amount to the electric motor 1 with a TRIAC and the like based on the amount of pull on the trigger. The solenoid coil 37 is connected to an output terminal 41*b* that directly outputs the power source voltage without regard for the state of the trigger. The relay 62 is turned ON and OFF by a limit switch 34 housed in the gear cover 14 and the timer circuit 63 housed in the handle 46. Ordinarily the relay 62 is rendered ON with the OFF state of the limit switch 34, but when the limit switch 34 is rendered ON, the relay 62 is maintained in an interrupt state by the timer circuit 63 for an established 3–5 seconds. This function cuts off power to the electric motor 1 and solenoid coil 37 during this time period, even if the trigger of the main switch 41 is pulled.

The electric motor 1 disposed in the housing 6 serves as a power drive portion PD, and includes a field 2, an armature 3 provided on the inside of the field 2, a brush 4, and a commutator 5. The electric motor 1 is rotated at highs speed of 20,000 r.p.m.

The speed reduction mechanism SR housed in the gear cover 14 includes a first pinion 7 fixedly mounted on an end of the motor shaft. A first spur gear 8 is rotatably supported in the gear cover 14 and is meshedly engaged with the first pinion 7 for decelerating the rotation of the motor one-thirteenth. A second pinion 9 is coaxially provided with the first spur gear 8, and a second spur gear 10 is meshedly engaged with the second pinion 9. Incidentally, the relationship between the first spur gear 8 and the second pinion 9 will be described in detail later with reference to FIG. 10. The second pinion 9 and the second spur gear 10 decelerate the rotation one-tenth. An output shaft 13 is rotatably extends through the gear cover 14, and a third or final spur gear 12 is mounted on the output shaft 13. A third pinion 11 is coaxially provided with the second spur gear 10 and is meshedly engaged with the third spur gear 12. The third pinion 11 and the final spur gear 12 decelerate the rotation one-eighth. In all, the three stage gear train decreases the speed one-thousandth, rotating the output shaft 13 at an overall no-load speed of about 20 r.p.m.

Figure 5:
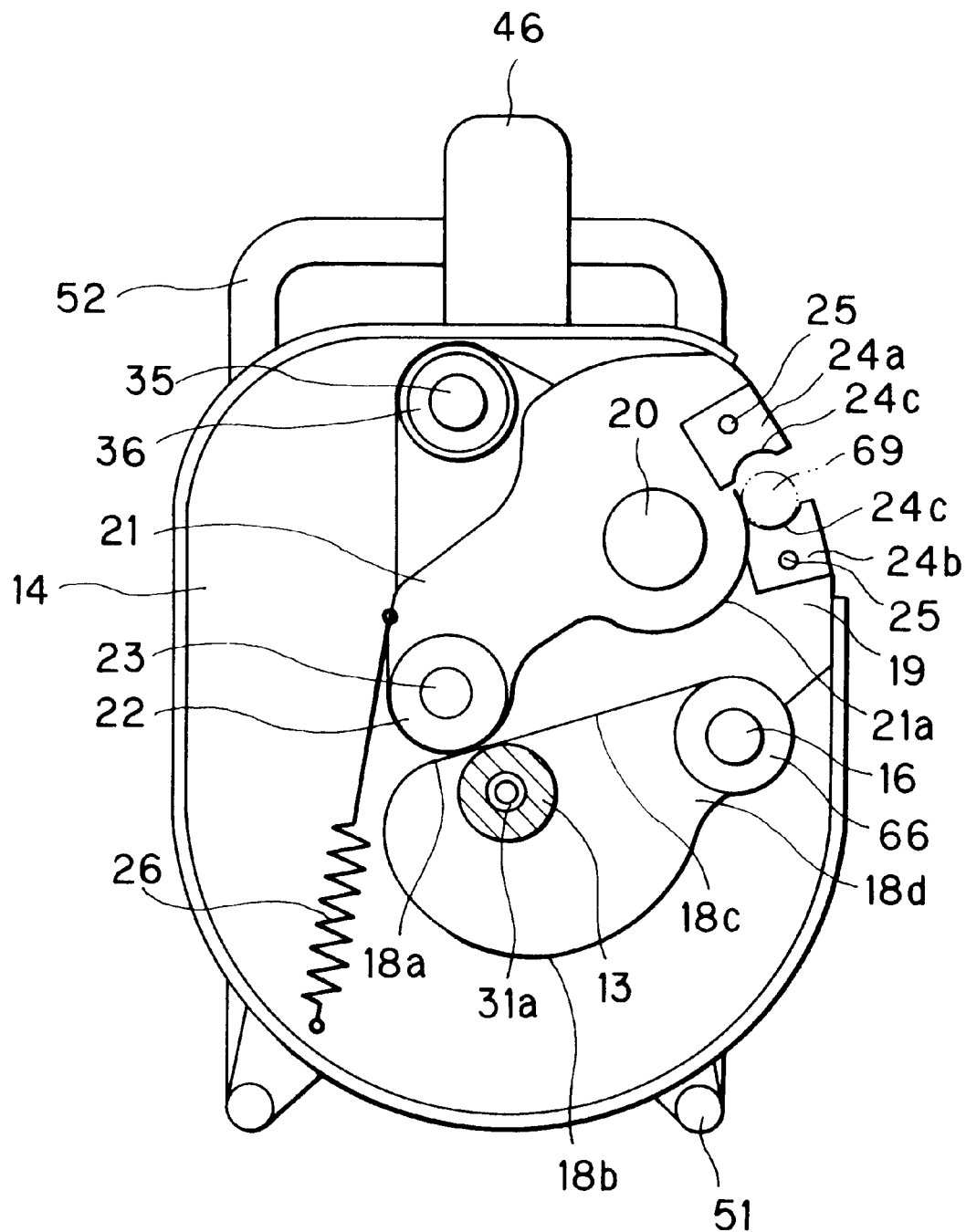
FIG. 5 is a front view showing an essential mechanical structure of the electrical cutting and bending tool of FIG. 1 with a cover and a rotating cover being removed.

The gear cover 14 is affixed to the end of the housing 6 by screws (not shown) and is constructed of two complementary halves that are bolted together (not shown) to contain the built-in three-stage spur gear train 7-12. A fixed member 19 is fixed on an outer side (left side open end in FIG. 1) of the gear cover 14 by bolts (not shown). The fixed member 19 has a boss portion 19*a*. A pivot arm 21 is pivotally supported on the left side of the fixed member 19 by a pivot shaft 20. The pivot arm 21 has a boss portion 21*a* at a position around the pivot shaft 20. A coil spring 26 is interposed between the pivot arm 21 and the gear cover 14 as shown in FIG. 5 so as to provide a contact of the DJ pivot arm 21 with the cam 18.

The output shaft 13 protrudes to the left from the fixed member 19 as shown in FIG. 1. As also shown in FIG. 5, a cam 18 is integrally provided with the output shaft 13. The cam 18, the pivot arm 21 and the fixed member 19 will constitute a cutting mechanism CT.

A cover 49 and a circular rotating cover 50 are separately provided beside and outer side of the cutting mechanism CT. A bending pin 16 protrudes from a maximum radius section 18*d* (FIG. 6) of the cam 18, and a center pin 27 provided integrally with the output shaft 13 and extends coaxially from the output shaft 13. Further, a receiving pin 35 protrudes from the fixed member 19. The bending pin 16, the center pin 27, and receiving pin 35 all protrude externally on the left side in FIG. 1. In short, the cutting and bending tool has four arrays arrangement including a first array having the fixed member 19 positioned beside the gear train 7-12, a second array having the cam 18 and the pivot arm 21 those positioned beside the fixed member 19, a third array having the cover 49 and rotating cover 50 those positioned beside the cam 18 and the pivot arm 21, and a fourth array having the bending pin 16, center pin 27, and receiving pin 35 those provided beside the cover 49 and rotating cover 50.

Figure 3:
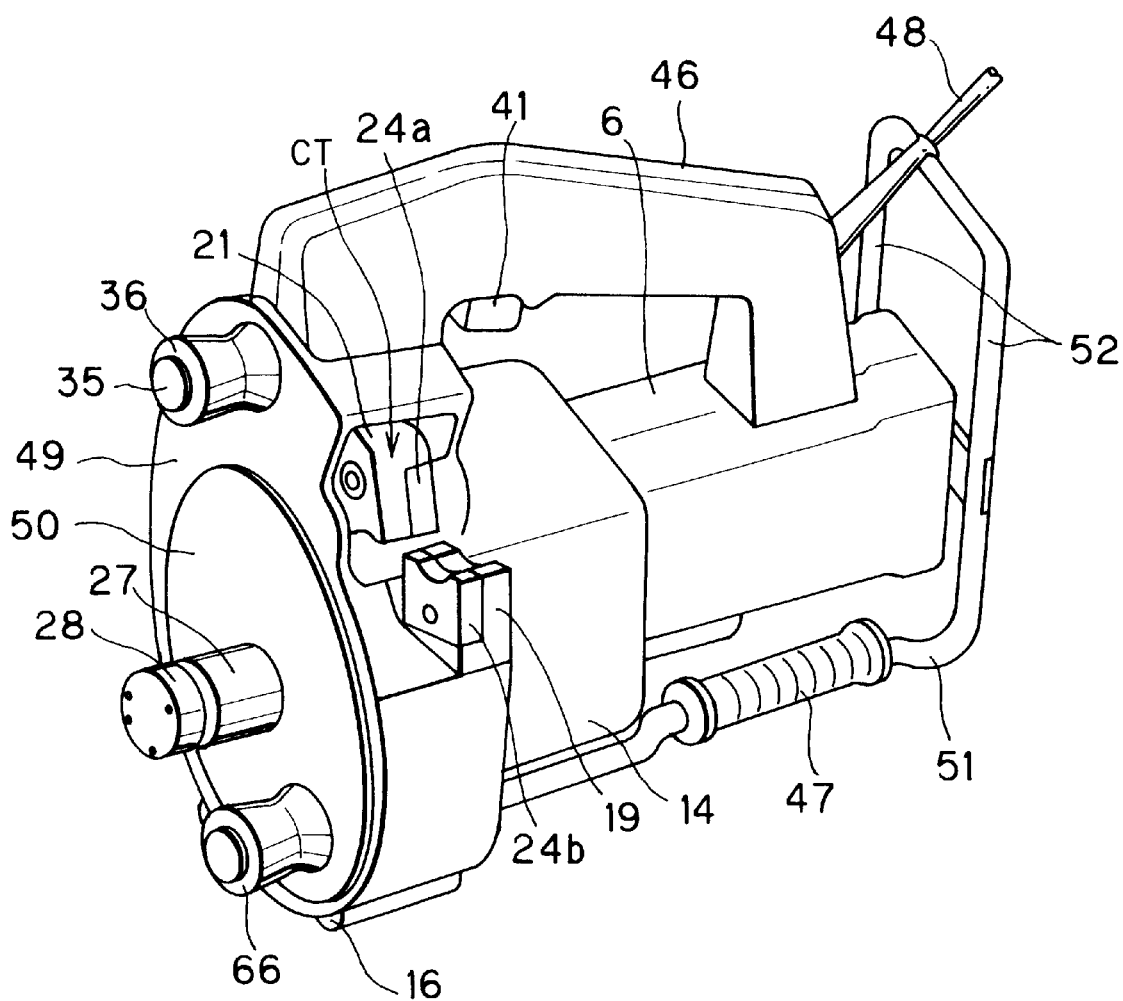
FIG. 3 is a perspective view showing the electric cutting and bending tool of FIG. 1.

As shown in FIGS. 1 and 3, a stand including a bottom stand 51 and a tail stand 52 provided integral therewith is affixed by screws (not shown) to the gear cover 14 and the housing 6. The stand is bent into L-shape around the lower rear portion of the housing 6. Looking at the entire tool from the side as in FIG. 1, the housing 6 and gear cover 14 are provided in the center, the cutting and bending mechanisms are provided on the left, the bottom stand 51 is provided on the bottom, the tail stand 52 is provided on the right, and the handle 46 is provided on the top.

Figure 4:
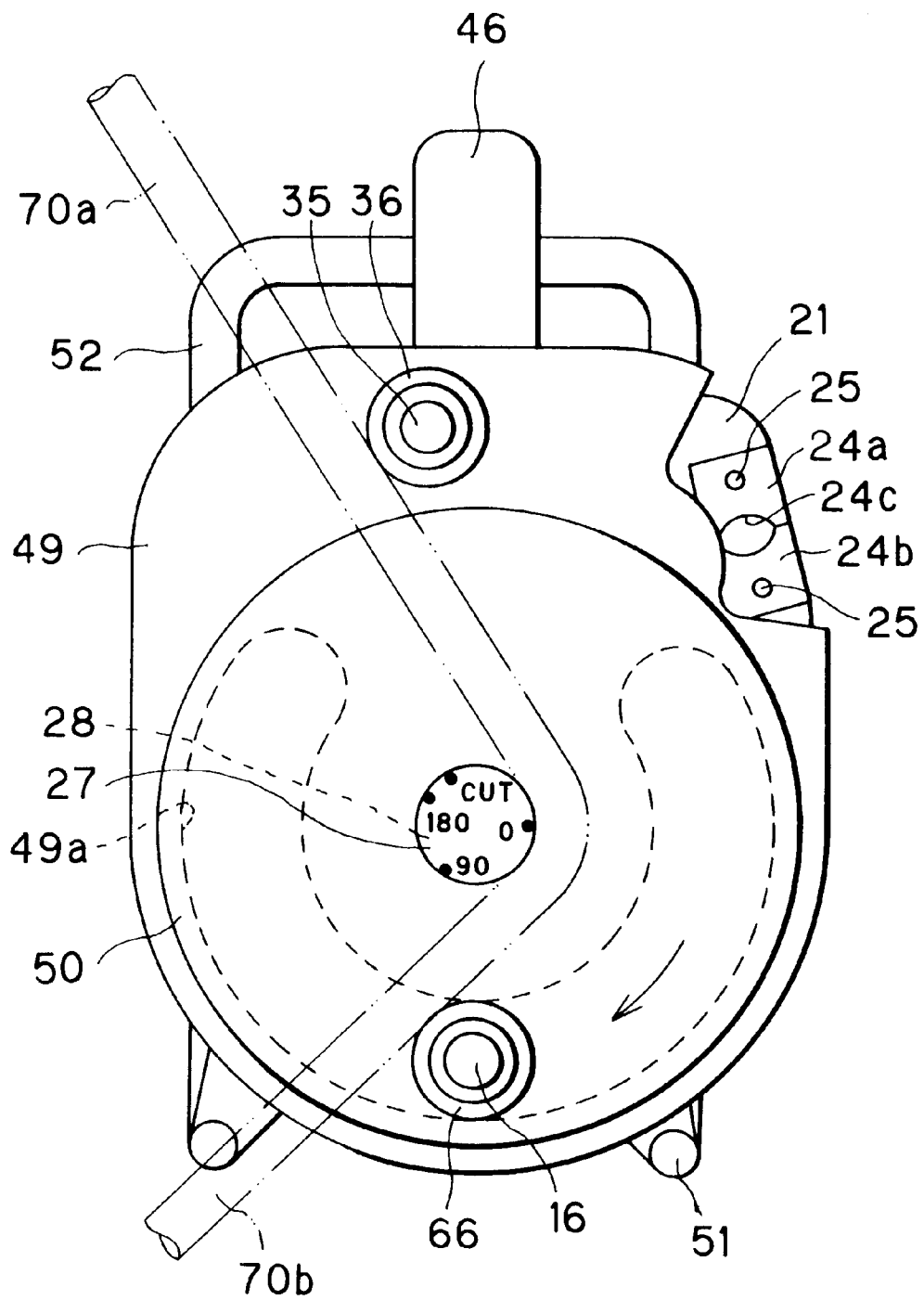
FIG. 4 is a front view of the electrical cutting and bending tool of FIG. 1.

Looking at the tool from the front, as in FIG. 4, the bottom stand 51 is provided on the lower area to support the main body. A semi-circular slot 49*a* is formed on the lower part of the cover 49, encircling the center pin 27 of the centrally positioned output shaft 13 and providing a moving passage for the bending pin 16. Further, a fixed cutting blade 24*b* is fixedly provided to the fixed member 19 and protrudes from the gear cover 14 on the right side.

As best shown in FIG. 4, the bottom stand 51 is constructed of two rod shapes, and is positioned opposite the handle 46. The center of gravity of the tool lies between the bottom stand 51 and the handle 46. A grip 47 (FIG. 1) is provided to the bottom stand 51 for holding or lifting the main body instead of or together with the handle 46.

Regarding the cutting mechanism CT, as shown in FIG. 1, the output shaft 13 is force fitted, from the right, with a bearing 65 fixedly supported to the gear cover 14. A key 17 is provided between the final gear 12 and the output shaft 13 for preventing the final gear 12 from rotating about the output shaft 13.

Figure 6:
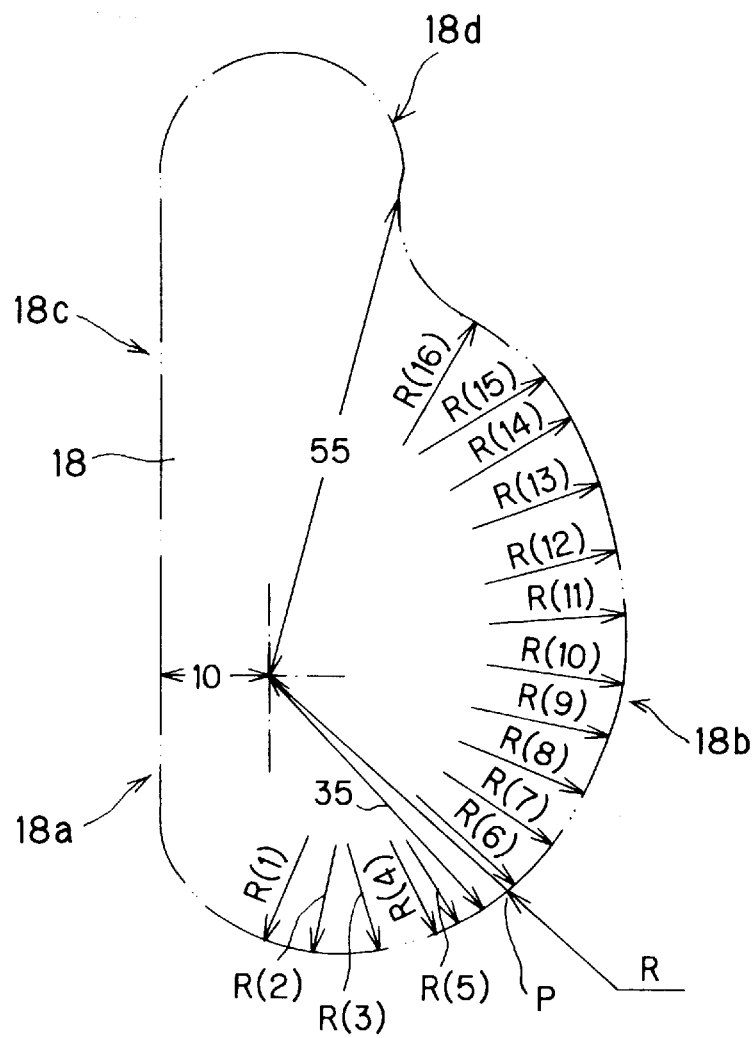
FIG. 6 is a front view showing a contour of a cam used in the cutting and bending tool according to the first embodiment.

As described above, the cam 18 is provided integrally with the output shaft 13. As shown in FIGS. 5 and 6, the cam 18 includes three cam surface sections, a fast-forward surface section 18*a* for rapidly increasing the radius, a cutting surface section 18*b* for slowly increasing the radius, and a return surface section 18*c* for returning the radius to its initial radius. Further, the cam includes the maximum radius portion 18*d* as described above to which the bending pin 16 is fixed.

Figure 12:
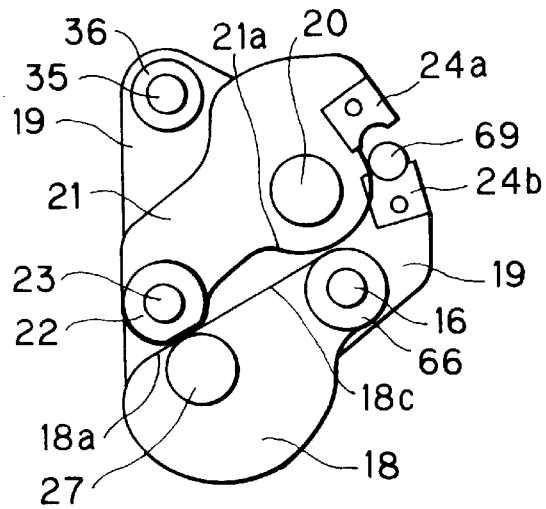
FIG. 12 is a front view showing a cutting mechanism in the cutting and bending tool and in which a movable blade is positioned at its stand by position.
Figure 13:
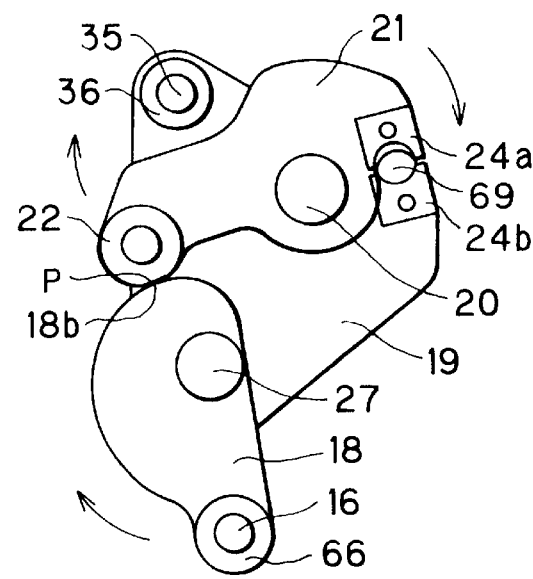
FIG. 13 is a front view showing the cutting mechanism, and in which the movable blade is moved toward a stationary blade.
Figure 14:
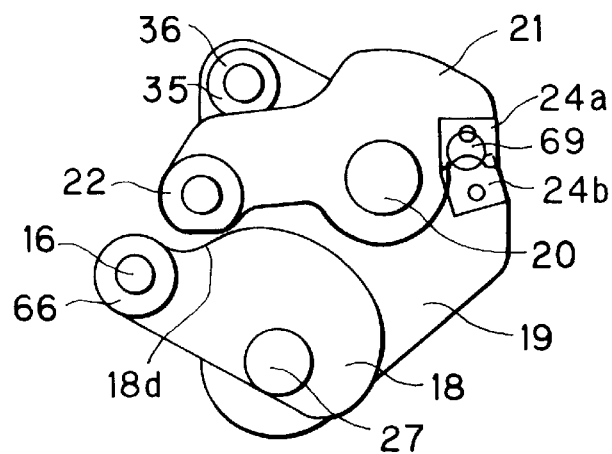
FIG. 14 is a front view showing the cutting mechanism, and in which the reinforcing rod is cut by these blades.
Figure 15:
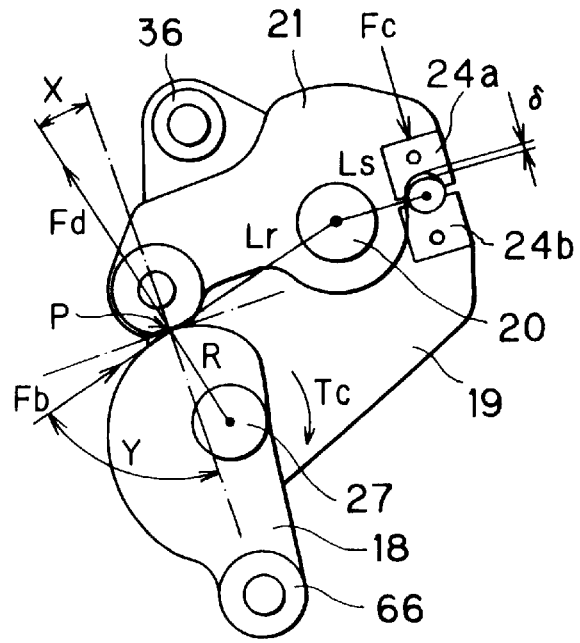
FIG. 15 is a front view showing the cutting and bending mechanism for description of principles for a power boosting effect attendant to the cam profile according to the first embodiment.

The fast-forward surface section 18*a* is a sharp slope which curvature is near a straight line with a radius that increases by 25 mm from 10 mm to 35 mm, within a range of about 20° measured from the center of the cam 18. The cutting surface section 18*b* has a gentle slope formed of a plurality of arcing surfaces with varying curvatures. Rod cutting operation is performed at the cutting surface section 18b. The radius of the cutting surface section 18b increases only by 20 mm from 35 mm to 55 mm, over a range of about 150° as measured from the center of the cam 18. The return surface section 18c is adapted for bringing into contact with the boss portion 21a (FIGS. 5 and 12) of the pivot arm 21, so that the excessive rotation of the cam 13 in the returning direction can be prevented by the abutment of the return surface section 18c against the boss portion 21a as shown in FIG. 12. The maximum radius portion 18d is adapted for engagement with a cam roller 22 (described later) so as to avoid excessive rotation of the cam 18 in the clockwise direction exceeding the preset rotation angle of the cam 18.

The portion of the output shaft 13 between the final gear 12 and the cam 18 is rotatably supported by the boss portion 19a of the fixed member 19. The output shaft 13 is supported rotatably by both the boss portion 19a and the bearing 65. As shown in FIG. 5, the pivot arm 21 is pivotally movably supported on the upper portion of the fixed member 19 by the pivot shaft 20. More specifically, the pivot arm 21 is provided rotatably with respect to the pivot shaft 20 which is force-fitted firmly into the fixed member 19. The pivot arm 21 has one end rotatably provided with the cam roller 22 through a needle 23, and another end fixed with a movable cutting blade 24a by a set screw 25 for cutting a reinforcing rod 69. The fixed cutting blade 24b is fixed to the fixed member 19 by a set screw 25 and opposes the movable cutting blade 24a. A cutting edge 24c of the cutting blades 24a, 24b are not flat, but are arcuate shape in a near semicircle having a diameter slightly larger than that of the reinforcing rod 69 to be cut.

A bending mechanism BD is provided by the cam 18, the center pin 27, the bending pin 16, a force receiving pin 35, etc. As shown in FIG. 1, a boss portion 18e having a thickness greater than that of the cam surface sections 18a–18c is provided at the maximum radius portion 18d of the cam 18. The boss portion 18e has a through-hole, and the bending pin 16 having a diameter of about 15 mm and a length of about 40 mm is force-fitted into the through-hole. If mechanical strength is a priority, the bending pin 16 can be formed as one piece with the boss portion 18e, but this would require more manufacturing time, resulting in a higher unit price. Also, the boss portion 18e must be made thick so that the through-hole can withstand the bending moment applied to the bending pin 16.

A bending roller 66 is rotatably supported on the bending pin 16. A lock washer 67 is provided between the bending roller 66 and the bending pin 16 for preventing the bending roller 66 from being released from the bending pin 16. The center pin 27 is integrally and coaxially provided with the output shaft 13 and protrudes farther externally than the cam 18. The diameter of the center pin 27 in the embodiment is 26 mm, provided to form the bending curvature of the reinforcing rod having the diameter of 13 mm to that diameter. However, the diameter of the center pin 27 can be changed to form different bending curvatures of the rod.

A hole is formed at a position 80 mm above the boss portion 19a of the fixed member 19, and a receiving pin 35 with a diameter of 15 mm and a length of 60 mm is force-fitted with the hole. Similar to the bending pin 16, the receiving pin 35 can be provided integrally with the fixed member 19 if high mechanical strength is required of the receiving pin 35. However, the separate manufacture of the receiving pin 35 and the fixed member 19 can facilitate production.

A receiving roller 36 is rotatably provided around the receiving pin 35 and is unreleasably secured to the pin 35 by a lock washer 68. The receiving pin 35 is of a cylindrical shape, and a peripheral surface of the receiving roller 36 has an arcuate cross-section. With such an arrangement, even if any foreign material such as cutting chips of the reinforcing rod get caught between the reinforcing rod and the receiving roller 36, the foreign material can be come out readily when force is applied, so that bending can be performed with the preset bending angle.

Figure 8:
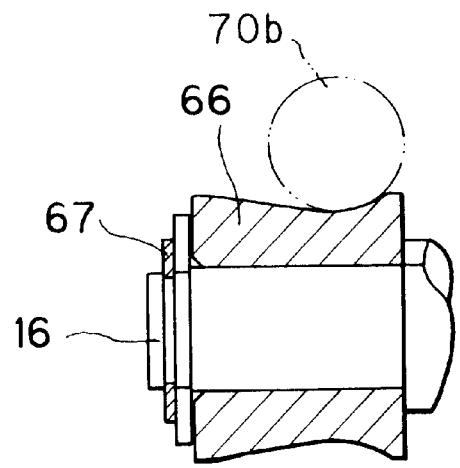
FIG. 8 is a cross-sectional view showing a bending roller used in the first embodiment, this cross-section being also applicable to a force-receiving roller.

Further, the bending roller 66 and receiving roller 36 are not simply cylindrical, but are irregularly shaped, such that the diameter becomes smaller toward the axial center as shown in FIG. 8. Furthermore, a minimum diameter portion of the bending roller 66 or the receiving roller 36 is positioned near the base end of the pins 16 or 35. This will decrease the bending moment acting on the respective pin 16, 35 those being supported in a cantilevered manner by the fixed plate 19. Further, because of this arrangement, the reinforcing rod can be drawn into the depressions of the rollers 66 and 36 and maintained near the base end of the pins 16, 35, which in turn prevents the reinforcing rod from slipping out of the rollers 66 and 36 even if the cutting and bending tool is lifted during the bending operation.

The receiving pin 35 is force-fitted with the fixed member 19 rather than the gear cover 14 so that the fixed member 19 will absorb the bending moment applied to the receiving pin 35. In this way, strength of the hole in the fixed member 19 can easily be attained, and there is no need to construct a thicker gear cover 14 or to reinforce the same with ribs, which would increase the overall size.

Figure 9:
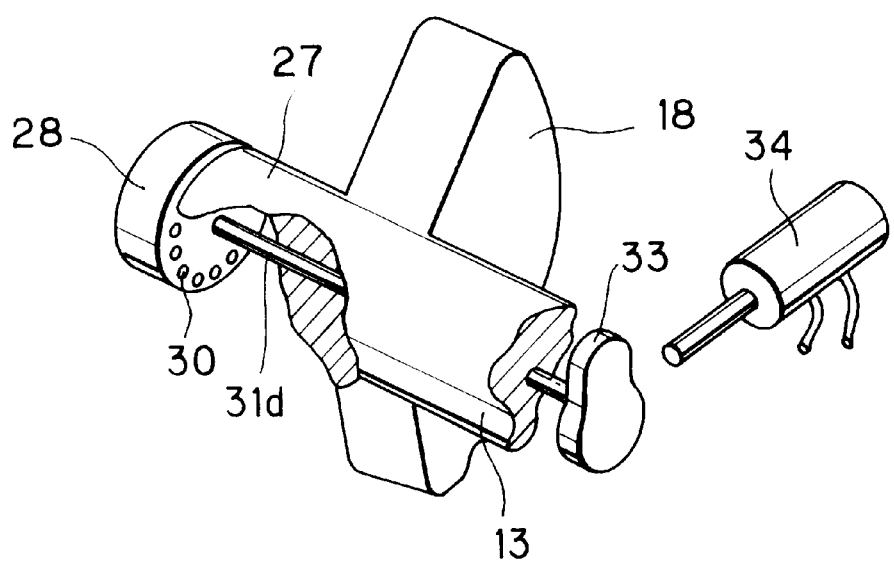
FIG. 9 is a perspective view showing the geometrical relationship between a limit switch and a dial those used in the first embodiment.

A bending angle adjusting mechanism is provided as shown in FIGS. 1, 4, and 9. This mechanism is adapted for adjusting bending angle of the reinforcing rod set on the bending mechanism BD.

A dial 28 is rotatably supported on the end of the center pin 27. A plurality of rounded recesses 30 are formed on an inner side of the dial 28 in a circular array about every 11.25°. Further, a ball 31 is provided engageably with one of the rounded recesses 30, and a biasing spring 32 is provided to urge the ball 31 toward the recess 30. A clicking or stepping rotation is achieved in the dial 28 because of the selective engagement of the ball 31 with one of the recess 30. Thus, the dial 28 can be rotated together with the output shaft 13 because of the ball 31 and the spring 32.

A rod 31a extends from the dial 28 through the length of the output shaft 13, and an actuator having a radially outward protrusion 33 is mounted on the rear end of the rod 31a. When the output shaft 13 is rotated to the angle set by the dial 28, the protrusion 33 is brought into abutment with the limit switch 34 (FIG. 1, FIG. 2) provided on the bottom of the gear cover 14 to render the limit switch 34 ON.

Figure 18:
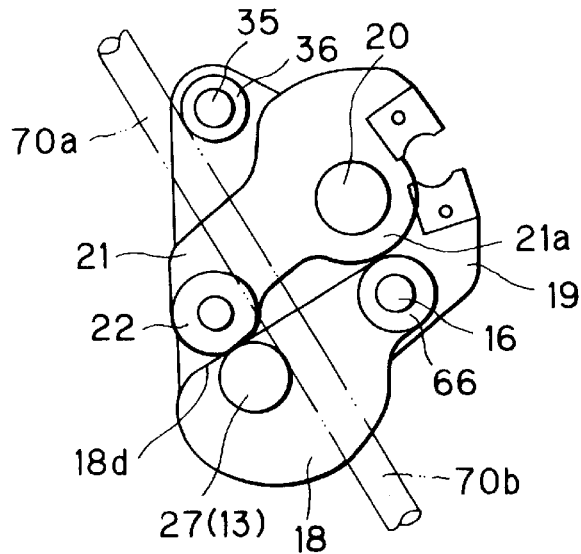
FIG. 18 is a front view showing a bending mechanism according to the first embodiment, and in which the cam and the pivot arm are positioned at their initial positions.

As shown in FIG. 4, graduations indicating bending angles from 0–180 degrees and cutting are provided on the surface of the dial 28. Thus, by setting the dial 28 according to the graduations, the user can select a desired bending angle (0–180°) or select the cutting mode. In case of the cutting mode, the "cut" indication is provided at an angular rotational position of the dial 28 about an additional 10° past the 180° graduation mark. In the cutting mode the pivot arm 21 moves the movable cutting blade 24a to its lowest position upon maximum elevated position of the cam roller 22. More specifically, an initial or stand-by position of the cam 18 is shown in FIG. 18. From the initial position, if the cam 18 is rotated by 50° in a clockwise direction, bending operation is started. This position corresponds to 0° on the dial 28. The position after the cam 18 rotates an additional 180° (a total of 230°), the position corresponds to a 180° whereby the reinforcing rod can be bent into U-shape. An additional rotation of 10° (total of 240°), the position corresponds to the cutting position.

Figure 10:
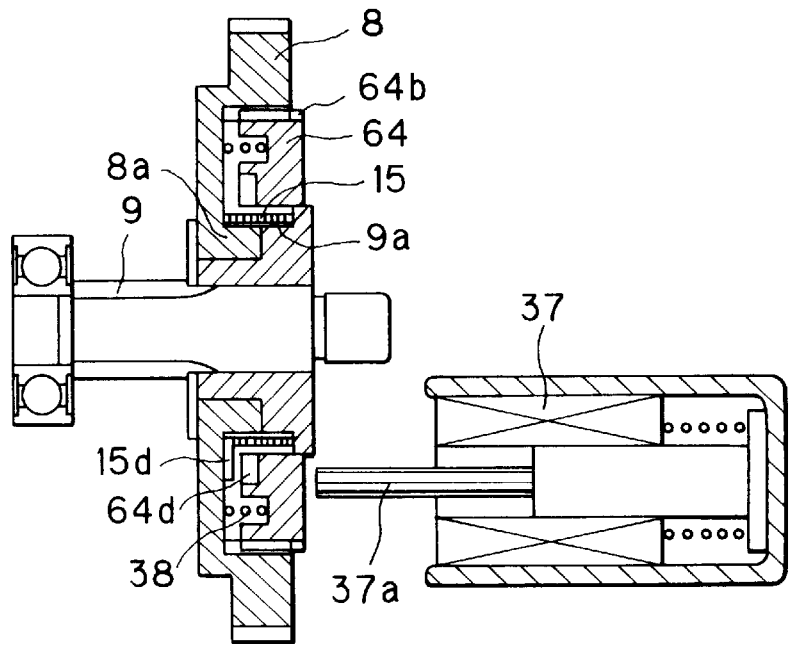
FIG. 10 is a cross-sectional view showing a clutch portion used in a cutting and bending tool according to the first embodiment.

In FIG. 10, the first spur gear 8 is rotatably supported on the second pinion 9. The first gear 8 has a boss portion 8a, and the second pinion 9 has a shaft portion 9a. A spring clutch 15 is snugly wound about the outer portions of the boss portion 8a and the shaft portion 9a. The spring clutch 15 is formed of a piano wire wound in the counterclockwise direction. An anchoring portion 15a is provided on one end of the spring clutch 15. The anchoring portion 15a has a length of about 8 mm extending in the circumferencial direction of the spring helix.

A sleeve 64 is positioned in an annular space defined between the first spur gear 8 and the shaft portion 9a of the second pinion 9. The sleeve 64 is formed with a groove 64a engageable with the anchoring portion 15a. A spline groove 64b is formed in the sleeve 64, so that the sleeve 64 can be moved in its axial direction with respect to the first spur gear 8, but cannot be freely rotatable relative to the first spur gear 8. Furthermore, the sleeve 64 is positioned in confrontation with a plunger 37a of the solenoid coil 37 also shown in FIG. 2, so that the sleeve 64 is movable in its axial direction. Further, a spring 38 is interposed between the spur gear 8 and the sleeve 64 for urging the sleeve 64 away from the spur gear 8.

With this arrangement, when the sleeve 64 is pushed into the first spur gear 8 by the solenoid coil 37, the anchoring portion 15a of the spring clutch 15 is brought into engagement with the groove 64a of the sleeve 64. With this state, if the first gear 8 is rotated in the counterclockwise direction, i.e., winding direction of the spring clutch 15, the spring clutch 15 becomes tight, so that the first spur gear 8 and the second pinion 9 can be rotated integrally.

When the bending pin 16 provided on the cam 18 reaches a prescribed angle, the protrusion 33 (FIG. 9) linked with the dial 28 pushes and turns ON the limit switch 34. The relay 62 linked with the limit switch 34 is then in an OFF state for 3–5 seconds timed by the timer circuit 63. The solenoid coil 37 also enters an OFF state, causing the plunger 37a to retract, which in turn causes the sleeve 64 to separate from the boss portion 8a of the first spur gear 8 by the biasing force of the spring 38.

At this moment, the electric motor 1 is also in an OFF state, but is still rotating due to inertia so that the first spur gear 8 is also rotating. However, the spring clutch 15 is momentarily slack over the shaft portion 9a. For this reason, the rotation of the first spur gear 8 is not transferred to the second pinion 9. Thus, the output shaft 13 can immediately stop rotation when the reinforcing rod can be bent to a preset bending angle.

A recovering mechanism is provided for restoring original angular position of the cam 18. As shown in FIG. 1, the final spur gear 12 is formed with a recess 12a on the left side thereof, and a torsion coil spring 60 is provided in the recess 12a. The torsion coil spring 60 has one end embedded in the gear cover 14 and another end engaged with the final spur gear 12 for constantly urging with a restoring force the cam 18 in the direction opposite to the driving direction of the electric motor 1. Because of the formation of the recess 12a, weight of the final spur gear 12 can be reduced, and the torsion coil spring can be housed in the recess 12a, which in turn can reduce the entire length of the tool in the axial direction of the output shaft 13.

Figure 11:
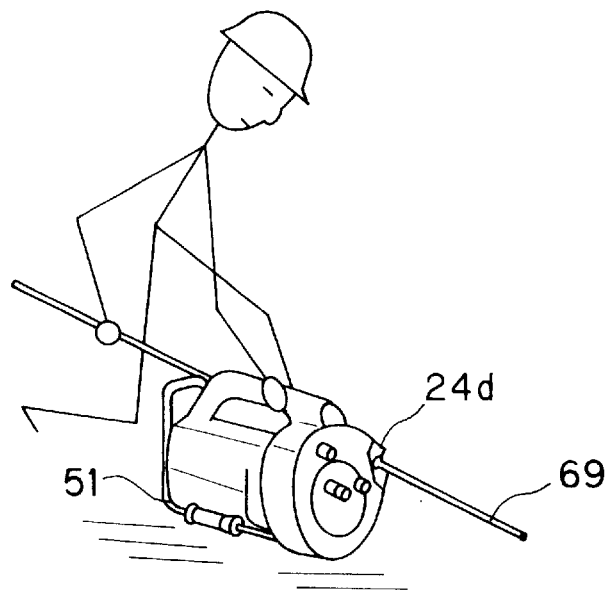
FIG. 11 is a schematic view for description of cutting work using the cutting and bending tool according to the embodiment.

Next, the cutting operation will be described. Very often a reinforcing rod 69 of about 5 m in length is cut laid out across the ground and cut. As shown in FIG. 11, the cutting and bending tool is set on the ground with the bottom stand 51 making contact with the surface of the ground, making it easy to set a reinforcing rod 69 that is parallel with the surface of the ground onto the fixed cutting blade 24b. In this way, the output shaft 13 and an axis of the semicircular cutting edge portions 24c on the cutting blades 24 can extend in parallel with the ground.

Then, the handle 46 is gripped and the switch 41 is operated with the right hand. While supporting the reinforcing rod 69 in the left hand, the user can easily fit the reinforcing rod 69 into the opening of the cutting blades 24 and set it on the cutting edge 24c of the fixed cutting blade 24b (see FIGS. 7 and 12), thus preparing for the cutting operation while the reinforcing rod 69 is even with the ground. At this time, the dial 28 is set to the cutting position, in which the cam 18 can rotate the maximum distance in the clockwise direction, and the cam roller 22 can be put nearly in contact with the maximum radius portion 18d of the cam 18. In other words, the pivot arm 21 can be raised to its highest position, causing the movable cutting blade 24a to move to its lowest position (see FIG. 14).

When the user pulls the trigger of the main switch 41, the limit switch 34 is not yet operating, and the relay 62 is rendered ON. Electric current flows to the armature 3 via the relay 62, the phase control terminal 41a of the main switch 41, and the field 2, and the electric motor 1 rotates at a speed adjusted according to the amount of pull on the trigger. Simultaneously, voltage from the output terminal 41b is supplied to the solenoid coil 37 upon pulling the trigger regardless of the amount of pull on the trigger, so that the plunger 37a of the solenoid 37 pushes the sleeve 64 against the biasing force of the spring 38. Accordingly, the anchoring portion 15a of the spring clutch 15 engages with the groove 64a of the sleeve 64. Because sleeve 64 is prevented from being freely rotated with respect to the first spur gear 8 by the spline groove 64b, the spring clutch 15 becomes tightly wrapped around the boss portion 8a and the shaft portion 9a by the rotations of the first spur gear 8. Thus, the first spur gear 8 and second pinion 9 are held together firmly as one piece. Thus, the rotation of the electric motor 1 can be transmitted to the output shaft 13 against the biasing force of the torsion coil spring 60, and accordingly, the cam 18 is rotated.

By the rotation of the cam 18, the cam roller 22 is pushed up abruptly by the fast-forward surface section 18a on which the radius (the distance from the rotation center of the cam 18 to the point of contact with the cam roller 22) of the cam 18 increases rapidly, causing the movable cutting blade 24a to rapidly move to the position at which cutting begins, closing the opening into which the reinforcing rod 69 was inserted (FIG. 12). With this fast-forward surface section 18a, the movable cutting blade 24a is closed in only about 0.2 seconds in a substantially no-load state and is ready to begin the actual cutting. Compared to a conventional cutting tool using an eccentric cam in the form of a circular disc shape or the hydraulic cutting tool, the cutting tool of the present embodiment requires remarkably less time and has a much shorter cutting stroke.

Next, the cam roller 22 begins to move along the cutting surface section 18b with the gently increasing radius, at which point the actual cutting begins. Here, the following equation can be established with reference to FIG. 15:

$$Fb = Tc/R$$

in which "Fb" represents a force directing in a tangential direction at a contact point P between the cam 18 and the cam roller 22, "Tc" represents the torque acting on the output shaft 13, and "R" represents a radius of the cam 18 between the center of the cam and the contact point P. Further, a force "Fd" is provided which is a force acting in the radial direction of the cam for lifting the cam roller 22 in this direction. "Fd" is 5–6 times as great as "Fb" because of the wedging effect caused by the gentle slope of the cam 18. This can be referred to as a power boosting function of the cam 18.

The relationship between "Fb" and "Fd" is expressed in the following formula;

$$Kc=Fd/Fb=\cos(X+\tan^{-1} U)/\cos(Y-\tan^{-1} U)$$

in which "Kc" is a power boosting ratio of the cam 18 (see FIG. 16), "X" is the pressure angle of the pivot arm 21, "Y" is the pressure angle of the cam 18, and "U" is the friction coefficient of the cam roller 22. The above formula omits the effect of the friction coefficient attendant to the pivot shaft 20 and the output shaft 13. However, such friction coefficient can be neglected. In the present embodiment, X is set to 5° and Y is set to 83°, making the power boosting ratio Kc about "6".

Figure 16:
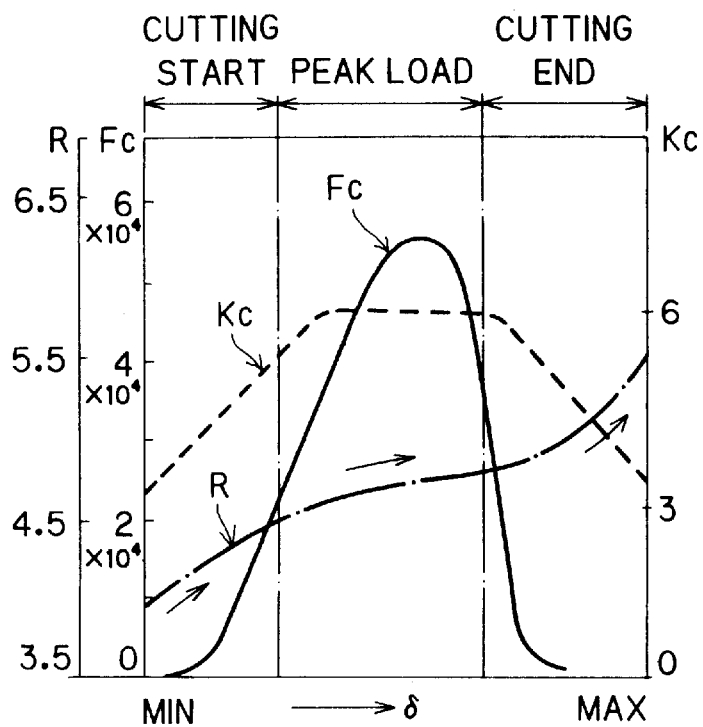
FIG. 16 is a graph showing the relationship between the cutting load on the reinforcing rod and the stroke of the movable blade according to the first embodiment.

The relationship between the cutting load Fc on the reinforcing bar 69 and the stroke δ of the movable cutting blade 24a is represented in a graph shown in FIG. 16. During the initial start-up stage of the cutting operation, the load is rising, and Y is relatively small by making the change in the radius R fairly large. Thus, Kc can be set rather small. Around the period of peak load, maximum Y should be set by making the change in the radius R fairly small, so that Kc is set to its maximum value. In this connection, as shown in FIG. 6, the cutting surface section 18b of the cam 18 includes a plurality of arcs linked together, and each arc has a different radius so that the pressure angle Y on the cam 18 gradually changes within the range of the cutting surface section 18b. At the end of the cut where the load is declining, the change in the radius R once again is made fairly large in order to reduce Y value so as to set Kc to be small.

To this effect, the above described contour of the cam 18 is provided. By this arrangement of the cam 18, changes in the force Fb and the torque Tc of the output shaft 13 can be restrained as small as possible by optimally setting the Kc value with respect to the Fc (cutting load) value and Fd(pushing force) value proportional to Fc those being varied at each angular position of the cam 18. As a result, the peak value of the driving torque Tc can be reduced, allowing the cam 18 to be driven efficiently by the small-scale electric motor 1 and associated gear train.

The force Fd pushing upwardly the cam roller 22 is transferred via the pivot shaft 20 to the cutting force Fc acting on the movable blade 24a. The cutting force Fc is multiplied by a leverage determined according to the ratio Lr/Ls, where Lr is the distance between the cam roller 22 and the pivot shaft 20 and Ls is the distance between the pivot shaft 20 and the movable cutting blade 24a. This leverage multiplication ratio is called "Kt".

In the present embodiment, Kt=Lr/Ls=60 mm/30 mm=2. Hence, when cutting a reinforcing rod 69 having a diameter of 13 mm, reinforcing rod cutting force Fc=56,000 N, cam 18 upwardly pushing force Fd=Fc/Kt=56,000/2=28,000 N, and cam 18 rotating force Fb=Fd/Kc=28,000/6≈4,660 N. These calculations show that the rotating force of the cam 18 is 1/12 the cutting force. In other words, a cutting force twelve times the rotating force of the cam 18 can be produced by the multiplying action obtained by the combination of the cam 18 and the lever, i.e., the pivot arm 21. In this example, the torque of the output shaft 13 is about 186 Nm, assuming the cam radius R at the point in which the cam roller 22 contacts the cam 18 is 40 mm. Therefore, a 186-Nm torque from the output shaft 13 is increased by the power boosting function of the cam 18 and the leverage multiplication of the pivot arm 21 to 56,000 N, at which force the reinforcing rod can be cut.

Figure 7:
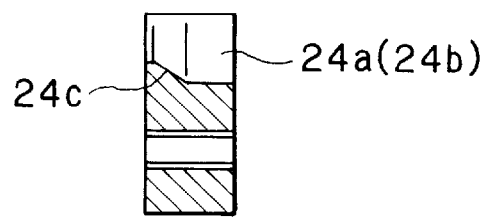
FIG. 7 is a cross-sectional view showing a cutting blade used in the first embodiment.

When the pivot arm 21 pivots around the pivot shaft 20, the movable cutting blade 24a is moved in an arcing path rather than linear path to the fixed blade 24b. Therefore, a force is applied on the reinforcing bar 69 in a direction away from the pivot shaft 20. To prevent the reinforcing rod 69 from slipping out, the cutting edges 24c are formed in circular arcs of a larger diameter than that of the reinforcing rod 69, as shown in FIGS. 5 and 7.

In summary, the bending pin 16 is integrally formed off-center on the surface of the cam 18, allowing the cam 18 to be used also as a pivot plate. For this reason, bearings for supporting the output shaft 13 cannot be provided on both sides of the cams 18, because the reinforcing rod to be bent is to be mounted on the cover 49. In other words, the cam 18 and the bending pin 16 are supported in a cantilevered fashion, making it necessary to reduce the pushing force on the cam roller 22, to reduce the force applied to the bearing 65 of the output shaft 13. To accomplish this, the pivot arm 21 is provided having the pivot shaft 20 in the center portion, the cam roller 22 on one end for rolling along the periphery of the cam 18, and the cutting blade 24a on the other end for cutting the reinforcing rod. The cutting mechanism portion is provided to swing the cutting blade 24a upward and downward with a force made large by the leverage "Kt" of the pivot arm. The pushing force on the cam roller 22 can be greatly decreased by the leverage of the pivot arm 21, not only decreasing the burden on the bearing 65 of the cantilever cam 18, but decreasing the rotating torque on the cam as well, allowing the tool to be constructed smaller and lighter.

Further during the cutting operation, the load on the output shaft 13 and other parts has distinctive characteristics at different points throughout the cut. Very little force is necessary to move the movable blade 24a from its initial open position to the closed position immediately before the cutting. After the exact cutting starts, the load gradually increases. Similarly, when the cutting ends the load drops. To take advantage of these load characteristics, an eccentric cam 18 is provided having the at least two very different curved surface sections, i.e., the fast-forward surface section 18a and the cutting surface section 18b. As described above, the fast-forward surface section 18a moves the movable cutting blade 24a quickly across the open space around the reinforcing rod, until the blade closes over the rod. Once the actual cutting begins, the cutting surface section 18b with the gently increasing radius designed to match the increasing load pushes against the cam roller. Although little force is generated in the rotating direction of the cam 18 during the cutting surface section, the wedge effect of the gently increasing slope produces 4–6 times the force in the direction of the radius, depending on the pressure angle. This multiplying ratio Kc can be freely set by adjusting the curvature on the edges of the cam 18. Therefore, a large pushing force can be obtained from the driving torque of a relatively small cam, allowing the body of the tool to be constructed smaller and lighter.

The pushing force obtained above is used against the cam roller 22 and, by the leverage Kt through the pivot shaft 20 of the pivot arm 21, generates a force in the cutting blade large enough to cut a reinforcing rod.

Next, the bending operation will be described.

The user grips and tilts the handle 46, so that the cutting and bending tool is rotated by 90° from its cutting posture (FIG. 11) until the tail stand 52 rests on the ground. The cover 49 and bending mechanism portion BD will now be on the top.

Figure 17:
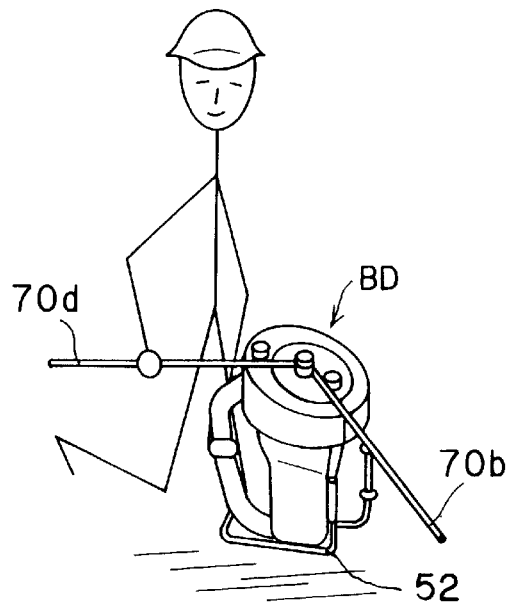
FIG. 17 is a schematic view for description of bending work using the cutting and bending tool according to the first embodiment.

The dial 28 is set to indicate the desired bending angle, and the reinforcing rod 70 is placed on the cover 49. That is, the reinforcing rod 70 is supported on the rotatable disc 50 and is positioned between the center pin 27 and the force receiving roller 36 as shown in FIGS. 4 and 18. The right hand supports the reinforcing rod 70 level to the ground and at the desired position, while the left hand grips the handle 46 and operates the main switch 41 as shown in FIG. 17. As in the cutting operation, if the trigger of the main switch 41 is pulled, the output shaft 13 is rotated to rotate the cam 18. The main switch 41 provides the speed control function according to the amount of pull on the trigger. If the pull on the trigger is strong, the electric motor 1 rotates quickly, and if the pull is weak, the electric motor 1 rotates slowly. In this way, the user can adjust the speed of the bending operation in a manner similar to manual bending operation. Since full voltage is supplied to the solenoid coil 37 regardless of the amount of pull on the trigger, the force for moving the plunger 37a does not weaken.

By the rotation of the cam 18, the bending pin 16 provided integrally with the cam 18 moves from the right side to the bottom and then to the left side, i.e., in the clockwise direction in FIG. 4. In accordance with the movement of the bending pin 16, the bending roller 66 urges the reinforcing rod 70 in the clockwise direction in FIG. 4, so that the reinforcing rod 70 is bent about and around the center pin 27.

Figure 20:
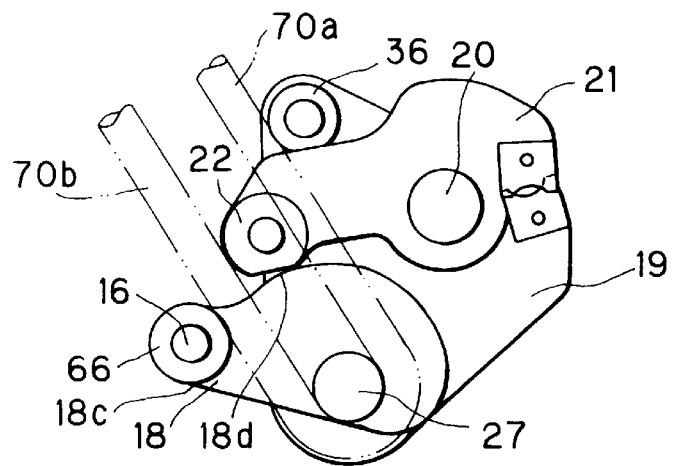
FIG. 20 is a front view showing the bending mechanism and in which the reinforcing rod is bent by 180 degrees.

For example, if the reinforcing rod is to be bent by 180°, the dial 28 is set to 180°. The cam 18 starts in the initial position shown in FIG. 18 and rotates about 50° before the actual bending begins. The cam 18 stops rotating at 230°, at which point the reinforcing rod 70 has been bent 180° in a U-shape as shown in FIG. 20.

Figure 19:
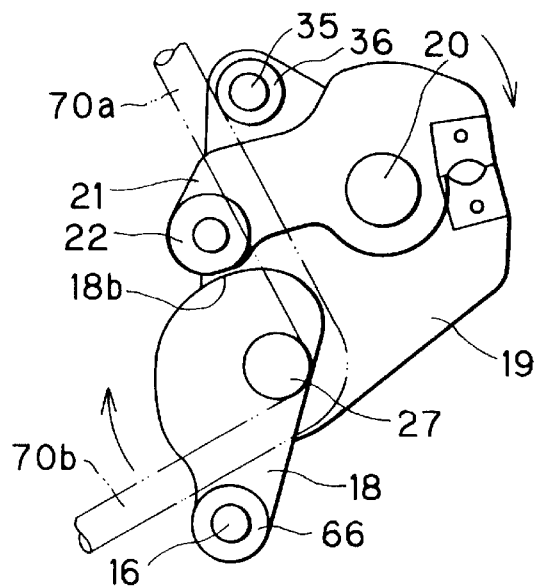
FIG. 19 is a front view showing the bending mechanism and in which the reinforcing rod is bent by 90 degrees.

During the bending process, the portion 70a of the reinforcing rod 70 is prevented from being moved in the clockwise direction by the force-receiving roller 36 on the receiving pin 35 and by the center pin 27. The bending roller 66 on the bending pin 16 moves clockwise from the right (FIG. 18) rotating around the center pin 27. The bending roller 66 pushes on the reinforcing rod 70 with a torque of about 150 Nm from the output shaft 13. Here, the load on the electric motor 1 during bending operation is slightly less than during cutting operations, and the rotating torque of the output shaft 13 is slightly smaller than during cutting operations. Thus, the reinforcing rod 70 is bent to a desired angle about the center pin 27 as shown in FIGS. 19 and 20. During the bending process, the large bending roller 66 and receiving roller 36 provided around the bending pin 16 and receiving pin 35, respectively, are rotated to lessen the frictional forces between the reinforcing rod 70 and the pins 16 and 35, so that the reinforcing rod 70 can be bent with a small torque.

In the bending operation, since the user is positioned on the side of the handle 46, the end portion 70b of the reinforcing rod 70 is positioned away from the user, and therefore, the end portion 70b moves at the position remote from the user (see FIG. 17), ensuring that the end portion 70b will not come in contact with the user.

Further, because of the specific shape of the bending roller 66 and the receiving roller 36 as shown in FIG. 8, the reinforcing rod 70 can be bent to the preset bending angle by an appropriate discharge of the foreign chips from the rollers 36, 66, and the reinforcing rod 70 can surely be maintained by these rollers 66 and 36.

The torque of the output shaft 13 required to bend a reinforcing rod having the diameter of 13 mm is about 150 Nm. This amount is slightly smaller than the 186 Nm torque needed for cutting the reinforcing rod, but nearly the same. This torque is achieved by the power boosting ratio Kc of the cam 18 used in the cutting operation and a multiplying ratio Kt of the pivot arm 21. If the torque of the output shaft 13 differs by between 0.7 times and 1.5 times for the bending and cutting operations, it is unnecessary to provide special gears having a large thickness and high mechanical strength for the speed reduction gear system. Rather, it is possible to provide gears with a proper heat treatment, or by using high-quality materials or by incorporating helical gears that can withstand this difference without having to change the dimensions. Further, the winding specifications and number of revolutions of the electric motor 1 can be adjusted to suit the situation to the extent that the size of the electric motor 1 or the gears need not be changed for either the cutting or bending operation. In this way, the size of the electric motor 1 and the gears can be made to balance well by using a minimum number of gears and choosing the lightest type possible.

Further, the pivot arm 21 used for the cutting and bending operation and the bending pin 16 needed for bending operation always move simultaneously. Therefore, the method for changing between the two operations is extremely simple, as the user need only set the dial 28 and change the orientation or posture the tool itself. No mechanism exists that can be changed between a cutting operation and a bending operation, both of which require a large torque that is obtained from the same output shaft 13. Thus, the tool according to the embodiment not only saves on cost, but is light, highly reliable, and fairly trouble free.

Figure 21:
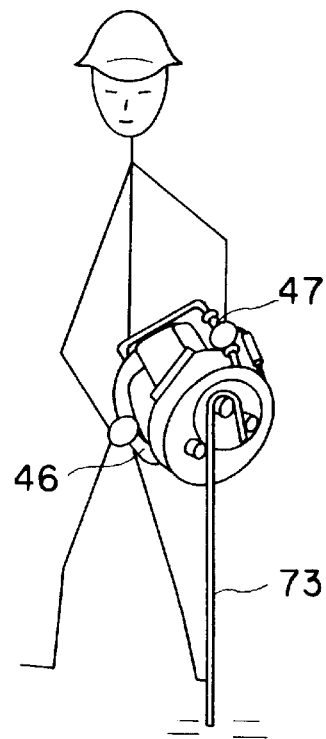
FIG. 21 is a schematic view for description of bending work performed on a previously set vertical reinforcing rod using the cutting and bending tool according to the embodiment.

To bend the end of a reinforcing rod 70 that has already been set either horizontally or vertically, the user lifts and supports the cutting and bending tool as shown in FIG. 21 by gripping the grip 47 of the bottom stand 51 with one hand and gripping the handle 46 with the other hand, and adjusts the position of the tool to suit the bending operation. In this posture, the grip 47 is positioned highest, and the handle 46 is positioned lowest. Now, the cutting and bending tool is in a stable position for the bending operation, and the user can operate the main switch 41.

When performing a bending operation to bend the reinforcing rod 180°, U-shape bending of the rod is completed as a result of 230° rotation of the cam 18 as described above. When performing a cutting operation, the cam 18 rotates an additional 10° for a total of 240°, at which point the movable cutting blade 24a reaches its lowest point and the cutting is complete. Here, the pivot arm 21 and the cam 18 are constructed on the same plane, and the maximum radius section 18d of the cam 18 will be engaged with the pivot arm 21, and prevents the further rotation of the cam 18 even if the cam 18 attempts to rotate more than 250°. Therefore, if the dial 28 is mistakenly set to the cutting mode when attempting to bend a reinforcing rod 180°, the reinforcing rod will not be excessively bent into in intersecting manner (for example "α" shape) since the difference in rotation between a 180° bend and a cut is only about 10°. Further, even if the limit switch 34 accidentally breaks down, the maximum radius portion 18d of the cam 18 can prevent the cam 18 from rotating more than 250° and prevents the reinforcing rod from being bent into a "α" shape.

After the cam 18 completes its rotation according to the angle of the rotation set, the cam 18 must be rotated in the opposite direction in order to return to the initial position, since the configuration of the cam 18 does not allow the cam 18 to rotate a full 360°. When the protrusion 33 (FIG. 9) coupled with the dial 28 pushes against the limit switch 34, the limit switch 34 is turned ON, causing the timer circuit 63 to turn OFF the relay 62 for 3–5 seconds. As a result, electricity to the electric motor 1 and the solenoid coil 37 is momentarily stopped. Due to inertia, the electric motor 1 will continue to rotate for several seconds after its power source has been turned OFF. However, when power to the solenoid coil 37 is cut off, and the rotation of the first spur gear 8 is no longer transferred to the second pinion 9. Consequently, rotation of the output shaft 13 is immediately stopped.

Because the final gear 12 is constantly urged in the returning direction of the cam 18 by the torsion coil spring 60 disposed in the recess 12a, the cam 18 is moved to its initial position by the biasing force of the torsion coil spring 60. Therefore, the speed reduction gear train from the final gear 12 to the second pinion 9, the output shaft 13, and the cam 18 all rotate in the opposite direction due to the restoring force of the torsion coil spring 60, until the cam 18 returns to its initial position, that is, until the cam roller 22 comes in contact with the first section 18a as shown in FIG. 12. In this case, the pivot arm 21 is pulled back (rotated in counterclockwise direction in FIG. 5) by the spring 26, and the movable cutting blade 24a is stopped at its maximum open position. When the cam 18 is in its initial position, the return surface section 18c, near the maximum radius section 18d contacts with the boss portion 21a of the pivot arm 21. This contact prevents the cam 18 from rotating back any farther.

This advantage is due to the fact that the cam 18 and pivot arm 21 are positioned on the same plane left of the fixed member 19 as viewed in FIG. 1. The movable cutting blade 24a can be stopped in its maximum opened position without the need for additional parts, and the reinforcing rod 69 to be cut can be easily inserted between the cutting blades 24 from the open side. Further, the bending pin 16 can be positioned at a fully retracted stop position for facilitating insertion of a new reinforcing rod 69 onto the fixed cutting blade 24b.

In the above described operation, upon completion of the cutting or bending operation, the pivot arm 21 and the cam 18 are returned to their initial positions after the limit switch 34 is actuated. If the main switch 41 is turned OFF during the cutting or bending operation so as to interrupt the operation, the power source is cut off through the relay 62 so that electric motor 1 and the solenoid coil 37 are rendered OFF. Thus, rotation of the output shaft 13 is stopped, and the cam 18 and the bending pin 16 are returned back to their initial positions because of the biasing force of the torsion coil spring 60.

In this case, if the user does not quickly release the trigger of the main switch 41, undesirable problems can occur. That is, after the returning process begins, the output shaft 13 rotates in the opposite direction, the protrusion 33 is moved away from the limit switch 34, and the limit switch 34 turns OFF once again, causing the relay 62 to turn ON. At this point, if the trigger of the main switch 41 is still depressed, the electric motor 1 will rotate again, the spring clutch 15 will begin to transfer the rotation, causing the cam 18 to stop its returning movement and to begin rotating again in the cutting or bending direction.

In order to solve this problem, in the present embodiment, the limit switch 34 does not directly turn the relay 62 ON and OFF. Instead, the timer circuit 63 is provided to force the relay 62 to continue cutting OFF the power source for 3–5 seconds, during which time the cam 18 can be returned to its initial position and the electric motor 1 and solenoid coil 37 will not operate even if the limit switch 34 turns OFF during the returning process. Further, 3–5 seconds allows the user to notice easily that the cutting or bending process has completed and allows enough time for the user to release the trigger of the main switch 41.

As described above, the following effects can be achieved in the first embodiment.

(1) The output shaft 13, speed reduction gear train 7-12, electric motor 1, and the like can be commonly used for the cutting and bending operation by providing the bending pin on the surface of the cam to form a bending mechanism and by using the power boosting mechanism of the cutting mechanism, which makes use of the wedge action of the cam and leverage action of the pivot arm 21. In this way, a light and low-cost tool can be constructed. The pushing force of the cam necessary for cutting can be greatly reduced by the leverage of the pivot arm, and therefore even if the bending pin is provided in the cantilevered manner on the cam 18, the cam can provide sufficient mechanical strength because excessively large force is not imparted on the cam, and a small motor and gears can be used.

(2) Further, providing the bending pin on the surface of the cam removes the need to provide a separate crank-type arm for attaching the bending pin, allowing a smaller tool to be created by a reduction in parts and a shortening of the output shaft. Thus, a light weight and compact tool results.

(3) It is possible to achieve a similar driving torque for bending and cutting by establishing an appropriate cam shape by the combination of a plurality of arcs to match the increasing load and by the suitable selection of the leverage. In other words, the driving torque's of the output shaft necessary for cutting and bending is nearly the same, that is, the driving torque (Tc) of the output shaft for the cutting operation and the driving torque (Tb) of the output shaft for the bending operation has the following relationship: $0/67<Tc/Tb<1.5$. Therefore, the electric motor 1, the speed reduction gear train, and the external surface of the tool can be used commonly for cutting and bending, allowing the size of the motor and gears to be minimized.

(4) Two stands 51, 52 are provided at right angles to each other to stabilize the body of the tool for cutting and bending operations on the surface of the ground. That is, the stand 51, 52 provided on the bottom and one side of the tool allows the cutting and bending operation to be performed simply by adjusting the body of the tool 90 degrees. Long reinforcing rods can be placed on the tool while level to the ground, avoiding wasted movement that can tire the user. When one stand is placed on the ground, the axial direction of the cutting blades is horizontal for cutting reinforcing rods level with the ground, removing the need to stand the rods vertically or otherwise move them for the cutting operation. The stand 52 for the bending operation is placed on the ground by gripping the handle 46 and rotating the tool back 90°. At this point the flat surface of the tool containing the bending, receiving, and center pins of the bending mechanism is facing up and level with the ground, enabling the user to insert a reinforcing rod that is also parallel to the ground and removing the need to stand the rods vertically or otherwise move them for the cutting operation.

(5) Also, the handle 46 is provided directly over the tool's center of gravity and contains a built-in switch 41 for operating the tool. This construction allows the bending and cutting operations to be performed on reinforcing rods at the building site, making it easy to repair and add reinforcing rods to suit the building plans.

In other words, the handle 46 is provided at a position directly above the center of gravity of the tool, allowing the tool to be supported with one hand. The switch 41 is built into the handle 46 at a position easily manipulated by a finger of the hand gripping the handle and is used to start and stop the motor 1. With this configuration, the tool can be supported directly above its center of gravity. Thus, not only can the tool be easily carried, but the switch can be operated while supporting the tool with one hand, enabling the user to lift and position the tool to reinforcing rods that need bending or cutting and, therefore, perform work at the construction site as the need arises.

(6) The pivot arm 21 and cam 18 are provided at the same height above the fixed member 19 so that the pivot arm 21 can stop the movement of the cam 18 when the cam 18 is returning to its initial position. The cam 18 can be stopped at a specified place without the need for additional parts. The pivot arm 21 also stops the cam at its furthest point of rotation, which is about 20 more than a 180 degree bend. Therefore, even if the limit switch malfunctions, the electric motor 1 will simply lock up, and no undesirable result will occur, such as the reinforcing rod being bent so far that its ends cross.

(7) The switch 41 is provided to the handle 46 and controls the speed based on the amount of pull on the trigger. Therefore, while supporting the body of the tool with the handle, the user can watch the cutting or bending operation being performed on the reinforcing rod mounted in the tool and control the speed with the trigger pull. The user can stop the operation immediately by releasing the trigger, achieving a manual speed reduction similar to that of a manual tool. In other words, to simulate the feel of conventional manually operated tools, the main switch 41 is capable of controlling the rotating speed of the motor 1 through increases or decreases in the pull on the trigger of the switch. If the pull on the trigger is strong, the motor 1 will rotate quickly, and if the pull is weak, the motor 1 will rotate slowly. In this way, the user can bend the reinforcing rod at very precise angles, driving the motor very slowly while watching the angle of the bend.

(8) The positional relationship of the bending pin 16 in the bending mechanism and the handle 46 is designed so that the end of the reinforcing rod is bent away from the user, preventing the reinforcing rod from coming in contact with the user. Although it is necessary to support the body of the tool when operating the switch, the user must always stand on the handle side of the tool to do so, the moving free end of the reinforcing rod does not come in contact with the user, assuring the safety of the user as described above.

(9) The tool is configured with the clutch that remains engaged regardless of the pulling degree of the trigger, making possible the use of the switch with adjustable speed, and achieving a cutting and bending tool giving the user a feeling of having manual control, as described in (7) above.

(10) After the electric motor 1 and the clutch (FIG. 10) are stopped by the limit switch 34 at the end of a bending or cutting operation, the cam is returned to its initial position by the biasing force of the torsion coil spring 60. Even if the limit switch 34 turns ON again before the cam 18 is fully returned to its initial position, the cam 18 will not be driven again, but the electric motor and clutch will be kept in an OFF state for a few seconds by the timer circuit. Thus, the user has enough time to release the main switch 41 and need not release it immediately after the limit switch 34 turns ON.

(11) The grips 47 are provided on the opposite side of the body from the handle 46, allowing the user to keep the tool's center of gravity between both hands while holding the tool in various positions. An even lower-priced cutting and bending tool can be provided if the grips also serve as a stand.

A bar cutting and bending tool according to a second embodiment of the present invention will next be described with reference to FIGS. 22 through 33.

Figure 22:
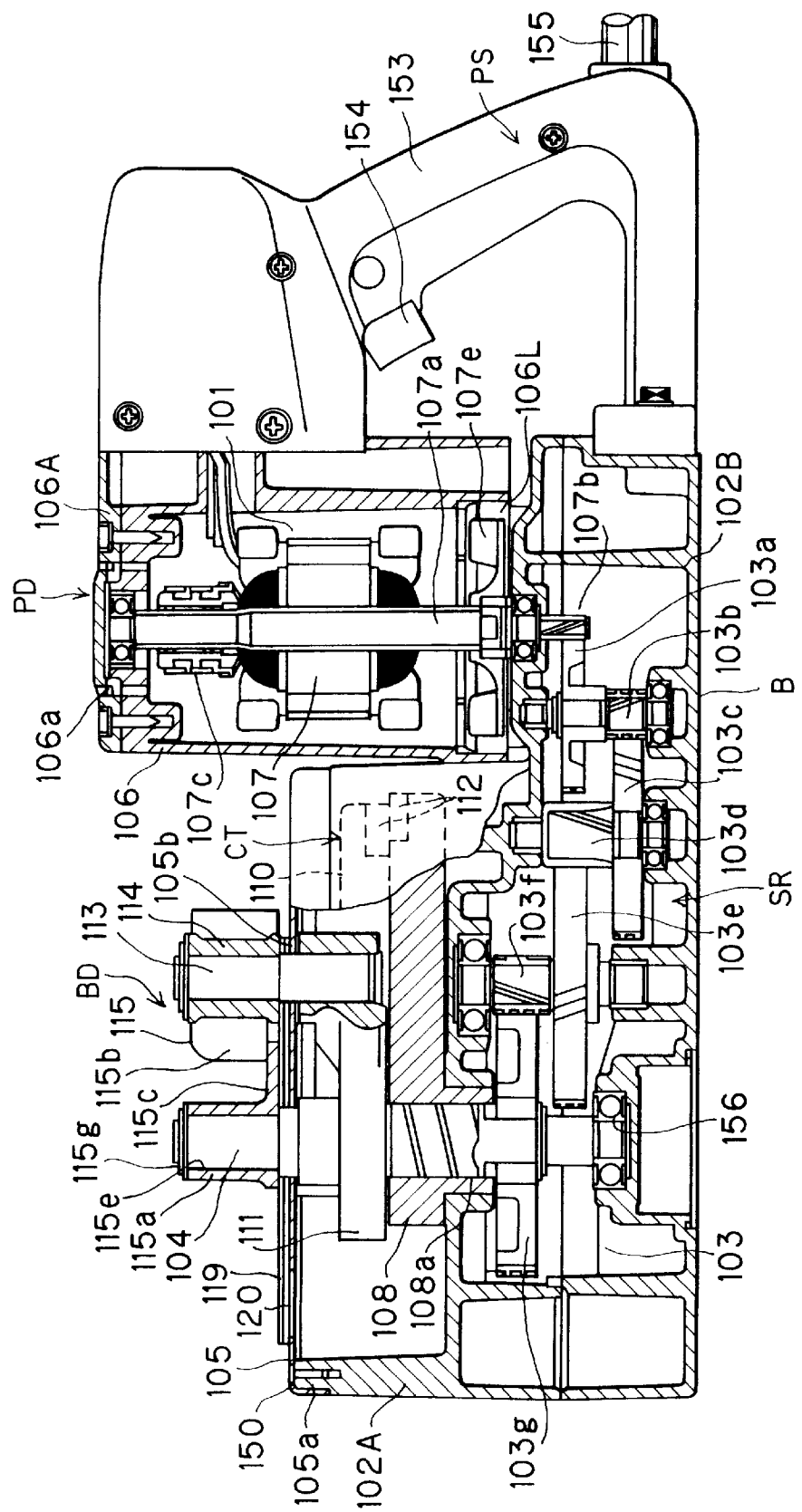
FIG. 22 is a cross-sectional view showing a rod cutting and bending tool according to a second embodiment of the present invention.

In FIG. 22, the cutting and bending tool includes a power source portion PS, a power drive portion PD, positioned beside the power source portion, a speed reduction portion SR, a cutting mechanism portion CT, and a bending mechanism portion BD. The power source portion PS, the power drive portion PD, the cutting mechanism portion CT or bending portion BD are arrayed in line.

The power drive portion PD includes a housing 106. The housing 106 is made of a resin, and has an upper end wall 106A formed with a cooling air suction port 106a, and a lower end portion formed with a cooling air discharge port 106b. A vertical length of the housing 106 is about 150 mm.

Within the housing 106, an electric motor 101 is accommodated. An armature 107 has a rotation shaft 107a extending in a vertical direction, i.e., extending toward a bottom B of a resultant device. The lowermost end of the rotation shaft 107a is coupled with a pinion 107b positioned within the lower portion 102B of the gear case 102. Further, the lower portion of the rotation shaft 107a is provided with a cooling fan 107e. The rotation shaft 107a has an upper end provided with a commutator 107c positioned in confrontation with the upper end wall 106A. Upon rotation of the rotation shaft 107a, the cooling fan 107e is rotated, so that an external air is introduced into the housing 106 through the cooling air inlet port 106a and is discharged through the discharge port 106b. The electric motor 101 is provided with a carbon brush (not shown).

The cutting mechanism portion CT is assembled in a gear cover 102 and a top plate 105. The gear cover 102 is an aluminum die-casting product and has a higher portion 102A and a lower portion 102B. The housing 106 is mounted on the lower portion 102B. The housing 106 is provided detachably from the lower portion 102B and from a power source portion PS, and therefore, an internal arrangement within the housing 106 can be easily inspected, and the carbon brush of the electric motor 101 can be easily exchanged with a new carbon brush to enhance maintenance. The higher portion 102A is provided with a top plate 105, so that the housing 106 is positioned beside the higher portion 102A. The housing 106 is positioned higher than the top plate 105 by about 60 mm.

The power source portion PS includes a handle 153 positioned at opposite side of the top plate 105 with respect to the housing 106, a cord 155 connected to the handle 153. A manipulation switch 154 is provided to the handle 153 for opening and closing a power supply circuit (not shown) to the electric motor 101. Further, a control circuit (not shown) are accommodated in the handle 153 for controlling rotation of the electric motor 101.

The speed reduction mechanism SR is provided in the gear cover 102 for transmitting a driving force of the electric motor 101 to the cutting mechanism portion CT and the bending mechanism portion BD. The speed reduction mechanism SR includes a gear train 103 constituted by spur gears. Four stage speed reduction is achieved for decelerating the rotation of the electric motor 101 to $\frac{1}{1000}$. That is, a first spur gear 103a is meshedly engaged with the pinion 107b, and a first pinion gear 103b is provided coaxially with and lower than the first spur gear 103a. A second spur gear 103c is positioned at the same level of the first pinion gear 103b and is meshedly engaged therewith. A second pinion gear 103d is provided coaxially with and upper than the second spur gear 103c. A third spur gear 103e is positioned at the same level of the second pinion gear 103d and is meshedly engaged therewith. A third pinion gear 103f is provided coaxially with and upper than the third spur gear 103e. A fourth spur gear 103g is positioned at the same level of the third pinion gear 103f and is meshedly engaged therewith. With this alternating arrangement, the resultant gear train 103 has a reduced height of about 70 mm, i.e., almost half of the power drive portion PD, within the gear cover 102, and is positioned at a lower part thereof.

The fourth spur gear 103g is coaxially mounted on an output shaft 104. The above described rotation shaft 107a of the electric motor 101 extends in parallel with the output shaft 104. The gear cover 102 is provided with a bearing portion 156 for rotatably supporting a lower end portion of the output shaft 104. Within the gear cover 102, a fixing member 108 is fixed to an intermediate height portion of the gear cover 102 and has a bearing portion 108a. Therefore, an intermediate portion of the output shaft 104 is rotatably supported by the bearing portion 108a of the fixing member 108. A center plate 115 described in detail later is positioned at a top side of the top plate 105. The center plate 115 has a sleeve portion 115a. An upper end portion of the output shaft 104 protrudes from the top plate 105 and is rotatably supported by the sleeve portion 115a. Thus, the output shaft 104 is rotatably supported at three locations, i.e., at the bearing 156, the bearing 108a and the sleeve portion 115a. The protruded part of the output shaft 104 serves as a center pin.

The cutting mechanism portion CT is connected to the speed reduction portion SR, and includes a cam 111, the fixing plate 108, a pivot shaft 109, a pivot arm 110 (best shown in FIG. 25), a stationary blade 112A provided to the fixing plate 108, and a movable blade 112B provided to the pivot arm 110. These blades 112A and 112B provide semicircular blade edges. The cam 111 is of a sector shape and is provided integrally with the output shaft 104, and has a cam contour the same as that of the first embodiment. The pivot shaft 109 is force-fitted with the fixing member 108, and the pivot arm 110 is pivotally movably supported to the fixing plate 108 by the pivot shaft 109. The pivot arm 110 has an end portion provided with a roller 160 in rolling contact with the cam 111. Height of the entire cutting mechanism portion CT is about 50 mm.

Figure 24:
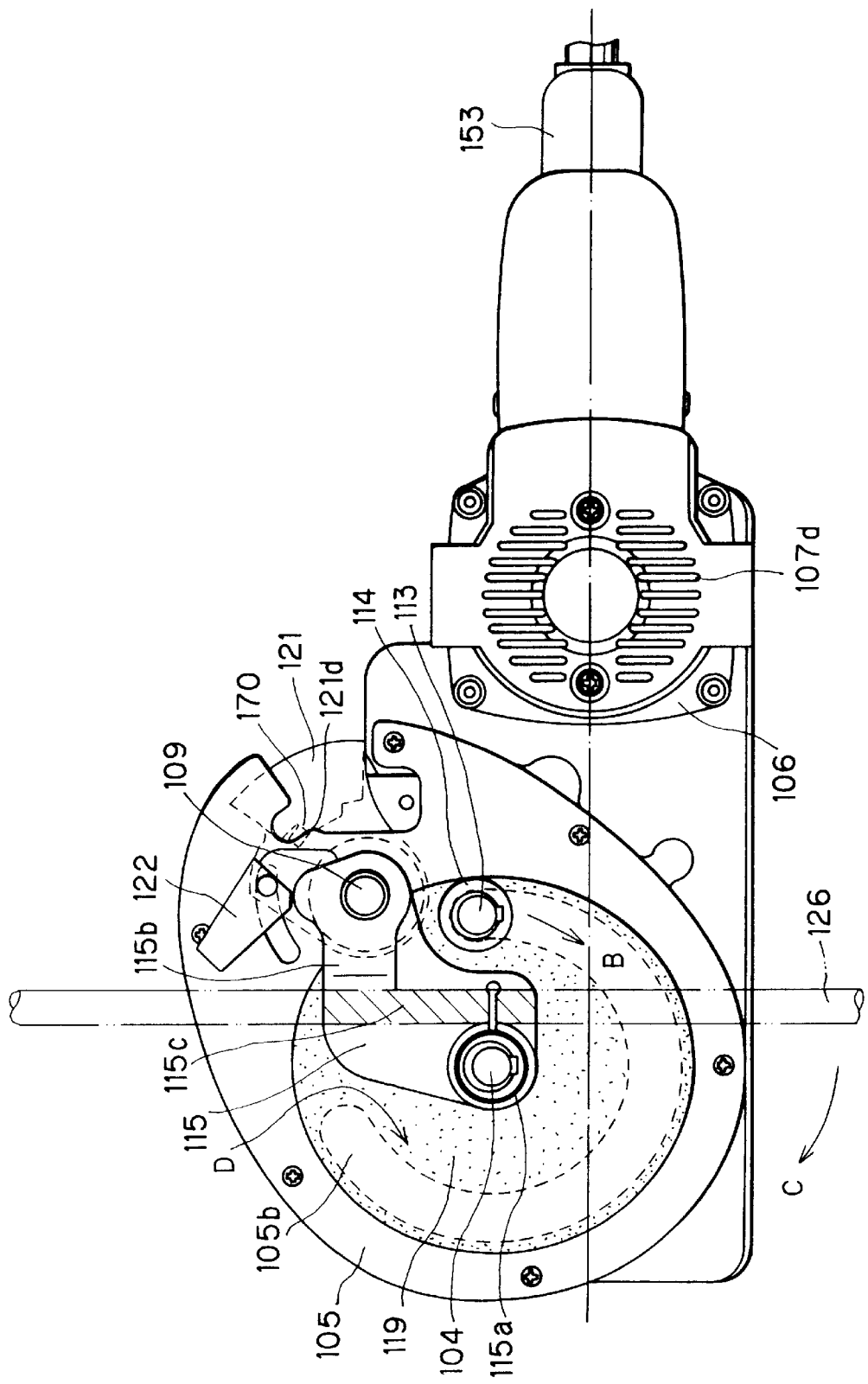
FIG. 24 is a plan view showing the cutting and bending tool of FIG. 22 and showing a rod bending operation.
Figure 25:
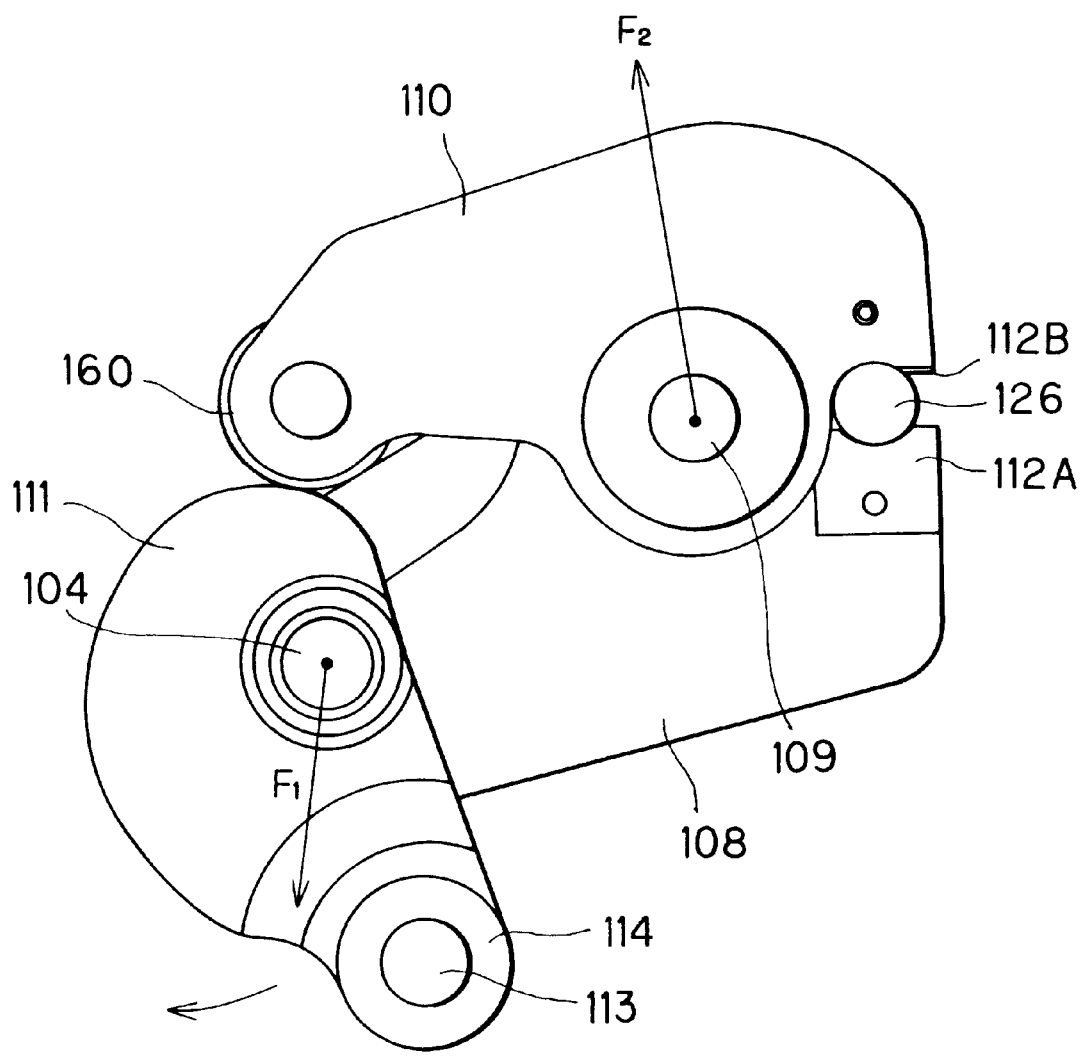
FIG. 25 is a plan view showing a driving mechanism for cutting and bending operation in the second embodiment.

The bending mechanism portion BD is positioned above the cutting mechanism portion CT. The bending mechanism portion BD includes the output shaft 104, cam 111, the center plate 115, a rod supporting portion 115b, the top plate 105, a disc plate 119, a bending pin 113 and a bending roller 114. As shown in FIGS. 22, 24 and 25, the bending pin 113 is force fitted with the cam 111 at a position deviating from the output shaft 104. A bending roller 114 is rotatably mounted over the bending pin 113 and is supported unreleasably from the bending pin by a stopwasher (not shown). Similar to the first embodiment, a dial (not shown) is provided for setting a bending angle of the reinforcing rod. The dial is connected to the control circuit (not shown) so as to stop rotation of the electric motor 101 when the bending pin 113 reaches the bending angle set by the dial.

Figure 23:
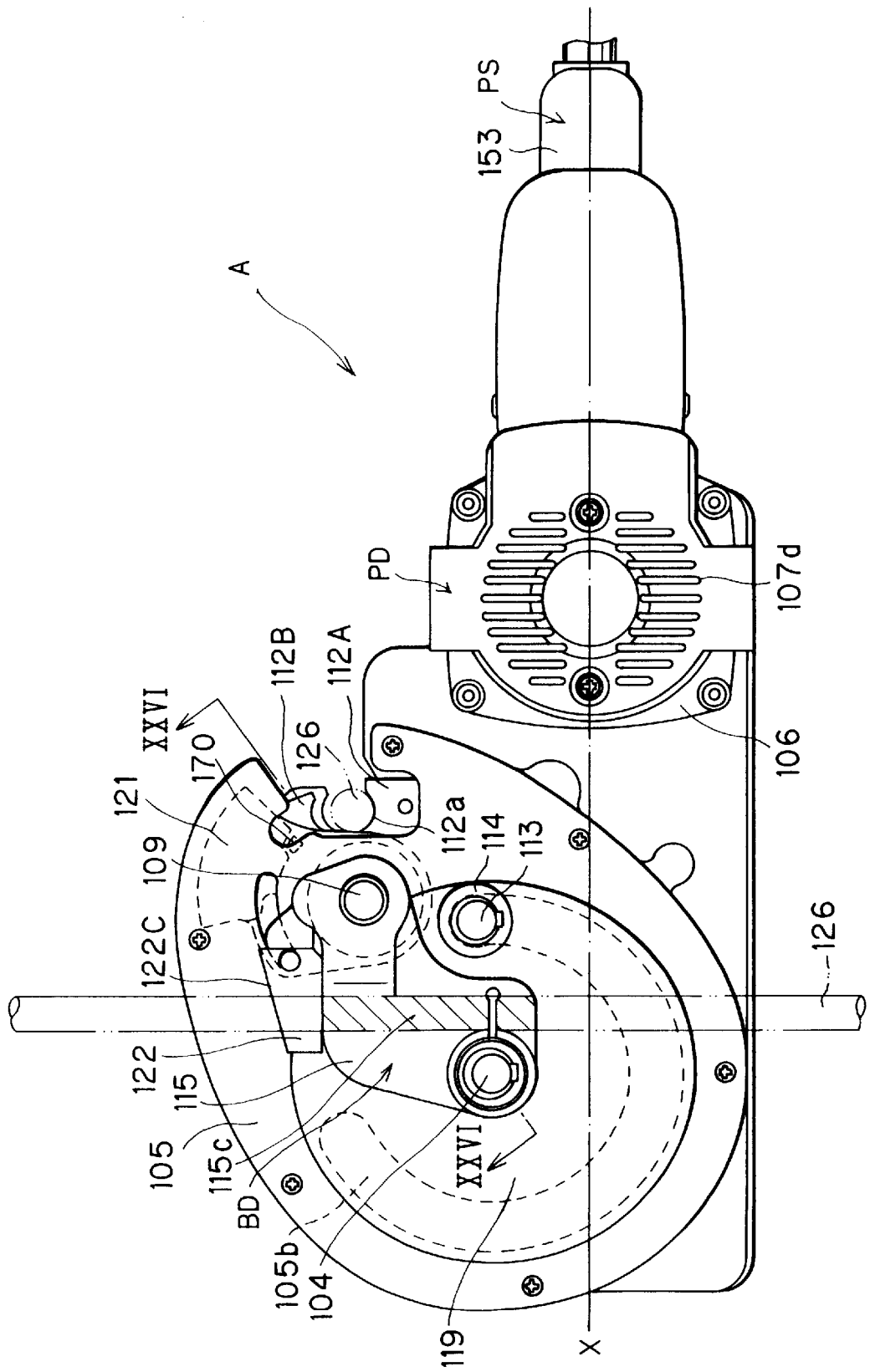
FIG. 23 is a plan view showing the cutting and bending tool of FIG. 22 and showing a rod cutting operation.
Figure 26:
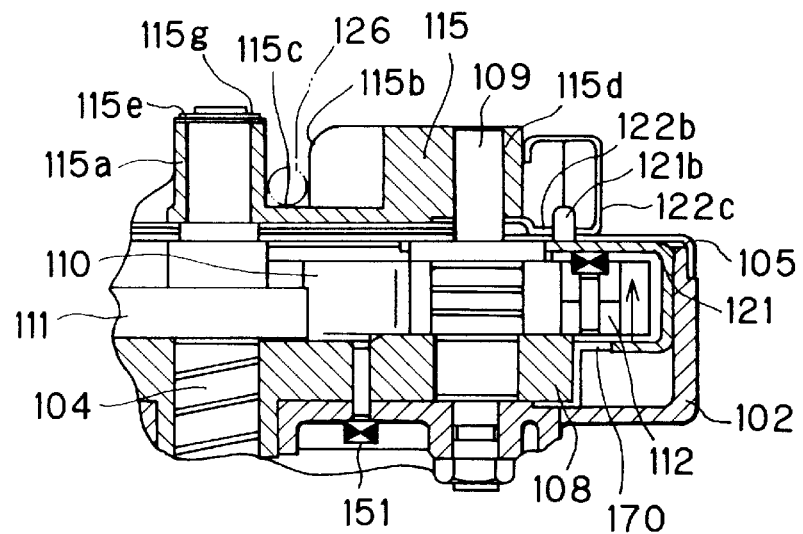
FIG. 26 is a cross-sectional view taken along the line XXVI—XXVI in FIG. 23.

As shown in FIGS. 22, 23 and 26, the center plate 115 is formed with holes 115e, 115d through which upper end portions of the output shaft 104 and the pivot shaft 109 extend. Therefore, the output shaft 104 and the pivot shaft 109 at positions one side of the cam 111 and the pivot arm 110 are supported by the center plate 115, and the output shaft 104 and the pivot shaft 109 at positions another side of the cam 111 and the pivot arm 110 are supported by the fixing plate 108. In other words, the cam 111 and the pivot arm 110 those imparted with a heavy load are stably supported by the center plate 115 and the fixing plate 108.

The center plate 115 is made of a rigid member having a thickness of about 5 mm, and has a top side provided with a sleeve member 115a rotatably supporting the upper end portion of the output shaft 104. The height of the sleeve member 115a is about 25 mm, twice as large as a diameter of the steel rod 126, and outer diameter of the sleeve member 115a is about 28 mm which is coincident of a bending diameter of the steel rod 126. The sleeve member 115a serves as the central pin around which the steel rod 126 is bent by the urging force from the bending pin 113. The center plate 115 is fitted with the output shaft 104 and the pivot shaft 109, and is simply fixed to the output shaft 104 by a stop washer 115g. Therefore, easy assembly of the center plate 115 results.

The rod supporting portion 115b is provided integrally with the center plate 115 at a position adjacent to the hole 115d or the upper end portion of the pivot shaft 109. The rod supporting portion 115b has a flat surface which serves as a counteraction receiving surface when bending the steel rod 126 around the sleeve member 115a. A steel rod passage 115c is defined on an upper surface of the center plate 115. Along the steel rod passage 115c, the steel rod 126 is mounted on the center plate 115 for bending operation. The steel rod passage 115c passes through the flat surface of the rod supporting portion 115b and a peripheral surface of the sleeve member 115a. The steel rod passage 115c can prevent the steel rod 126 from being in direct contact with the disc plate 119. The center plate 115 having the sleeve member 115a, the rod supporting portion 115b, the steel rod passage 115c and the holes 115e and 115d are integrally formed by lost wax casting method in order to provide a sufficient strength and facilitate assembly and machining.

The top plate 105 is made of a thin steel plate having a thickness of about 2 mm so as to protect an upper area of the higher portion 102B of the gear cover 102. The top plate 105 is fixed to the gear cover 102 by a screw 150. An upper edge portion 105a of the top plate 105 is subjected to drawing or round shaping so as to avoid damage or flaw by a workpiece, i.e., steel bar 126 (FIG. 24).

As described above, the cam 111 and the pivot arm 110 are covered by the top plate 105, and the boundary between the top plate 105 and the gear cover 102 is air-tightly sealed by the drawing portion 105a. Further, the upper end portion of the bending pin 113 extends through the top plate 105, and the bending roller 114 is rotatably mounted over the upper end portion of the bending pin 113. The top plate 105 is formed with an arcuate slot 105b whose contour corresponds to a moving locus of the bending pin 113 in accordance with the rotation of the cam 111 about the output shaft 104.

The disc plate 119 is of a circular shape and is interposed between the center plate 115 and the top plate 105 for covering the arcuate slot 105b of the top plate 105. The disc plate 119 is of a circular shape and is formed of a thin steel plate having a thickness of about 2 mm. The disc plate 119 is provided coaxially with the output shaft 104, and the bending pin 113 extends through the disc plate 119. Therefore, upon movement of the bending pin 113, the disc plate 119 is rotated about the axis of the output shaft 104.

A flexible or elastic member such as a felt sheet 120 is adhesively bonded to a back surface of the disc plate 119. That is, the felt sheet 120 is interposed between the disc plate 119 and the top plate 105. The felt sheet 120 has an inner and outer diameter identical with those of the disc plate 119. The felt sheet 120 is slightly shrunk by the center plate 115 positioned immediately above the disc plate 119. The felt provides lubrication oil retainability. Therefore, the bar cutter/bender can provide rust-proof characteristic as well as dust proof characteristic.

A portion between the disc plate 119 and the top plate 105 and positioned at radially outer side of the arcuate slot 105b is sealed by the felt sheet 120 by a radial length of about 5 mm. On the other hand, another portion between the disc plate 119 and the top plate 105 and positioned at radially inner side of the arcuate slot 105b is sealed by the felt sheet 120 by a radial length of about 30 mm. That is, both radially outer and inner sides of the arcuate slot 105b are sealed by the felt sheet 120. Because of the provision of the disc plate 119 and the felt sheet 120, a dust proof structure can be provided for preventing ambient dusts or cutting chips from being entered into the gear cover 102 through the arcuate slot 105b.

Further, a safety arrangement is provided at the cutting mechanism portion CT and the bending mechanism portion BD. The safety arrangement includes a protection cover 121 and a block lever 122 as shown in FIGS. 23 through 31. That is, the stationary and movable blades 112A and 112B are covered by the protection cover 121 during rod bending operation, and the steel rod passage 115c is blocked by the blocking lever 122 during rod cutting operation.

Figure 27:
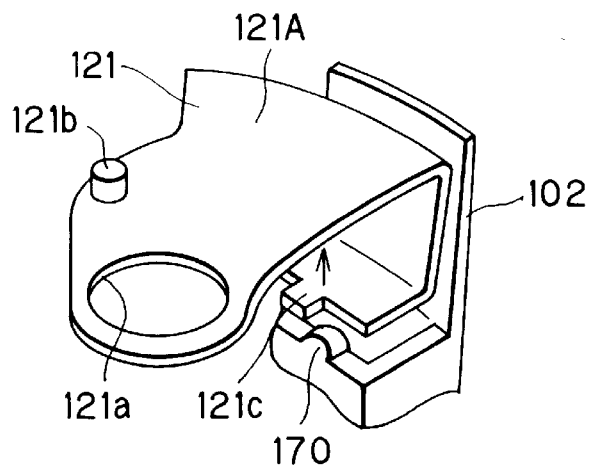
FIG. 27 is a perspective view showing a protection cover used in the second embodiment.
Figure 28:
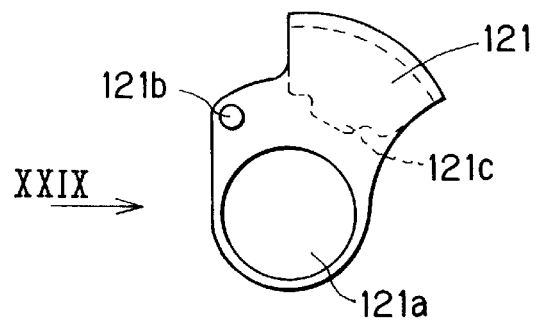
FIG. 28 is a side view showing the protection cover of FIG. 27.
Figure 29:
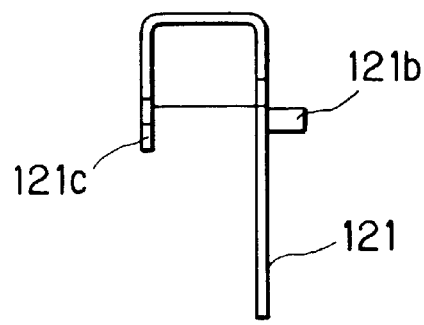
FIG. 29 is a side view as viewed from an arrow XXIX of FIG. 28.

As shown in FIGS. 27 through 29, the protection cover 121 is of a U-shape cross-section so as to cover the blades 112A and 112B. The protection cover 121 is made of a transparent resin, and is disposed within the gear cover 102. The protection cover 121 has a flat plate section 121A is formed with a hole 121a through which the pivot shaft 109 extends. The flat plate section 121A is provided with a protrusion 121b projecting in the axial direction of the pivot shaft 109.

At a free end portion of the protection cover 121, a projection 121c projecting toward the axis of the pivot shaft 109 is provided. As shown in FIGS. 26 and 27, a semicircular locking projection 170 is formed at the gear cover 102 at a position confrontable with the projection 121c when the protection cover 121 is pivotally moved over the blades 112A and 112B. Upon engagement of the projection 121c with the locking projection 170, the protection cover 121 is held at the blade covering position. Further, the protection cover 121 can provide a resilient deformation, so that the projection 121c can ride over or be disengaged from the locking projection 170 upon application of sufficient force.

Figure 30:
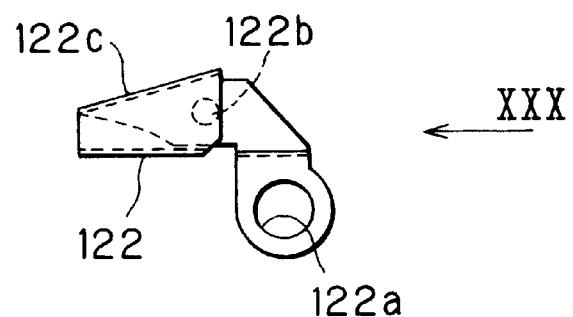
FIG. 30 is a side view showing a blocking lever used in the second embodiment.
Figure 31:
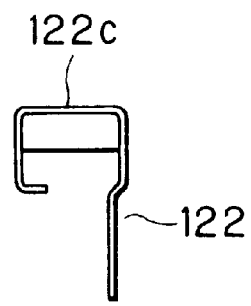
FIG. 31 is a side view as viewed from an arrow XXX of FIG. 30.

The blocking lever 122 shown in FIGS. 30 and 31 is formed of an iron plate having a thickness of 1 mm. Similar to the protection cover 121, a hole 122a is formed through which the pivot shaft 109 extends. Further, the blocking lever 122 is formed with an engagement hole 122b engageable with the protrusion 121b of the protection cover 121. Furthermore, a wall portion 122c is provided extending in a direction parallel with the pivot shaft 109.

The protection cover 121 and the blocking lever 122 are rotatably supported over and unreleasable from the pivot shaft 109 by a stop washer (not shown). More specifically, the protection cover 121 is pivotally moved about the pivot shaft 109 by about 45° in accordance with the pivotal motion of the blocking lever 122. The protrusion 121b is engageable with the engagement hole 122b through the top plate 105, and the base portion of the blocking lever 122 is supported between the top plate 105 and the center plate 115. Thus, the protection cover 121 and the blocking lever 122 are interlockingly pivotally moved about the pivot shaft 109 because of the engagement between the protrusion 121b and the engagement hole 122b. It is unnecessary to provide a components or parts for the interlocking movement of the protection cover 121 and the blocking lever 122. Therefore, economical safety arrangement results.

As best shown in FIG. 23, the power source portion PS, the power drive portion PD, and the top plate 105 in connection with the cutting mechanism portion CT and the bending mechanism portion BD are arrayed in line in an order from right to left. The stationary and movable blades 112A, 112B are located at an intermediary area between the bending mechanism portion BD and the power drive portion PD. In other words, the actual cutting spot is located adjacent to a center of gravity of an entire rod cutting and bending tool, since the power drive portion PD and the cutting mechanism portion CT generally have heavy weight. In case of a rod bending operation, the steel rod 126 is on a steel rod passage 115c which extends perpendicular to a line X connecting between the power source portion PS and the power drive portion PD.

Figure 32:
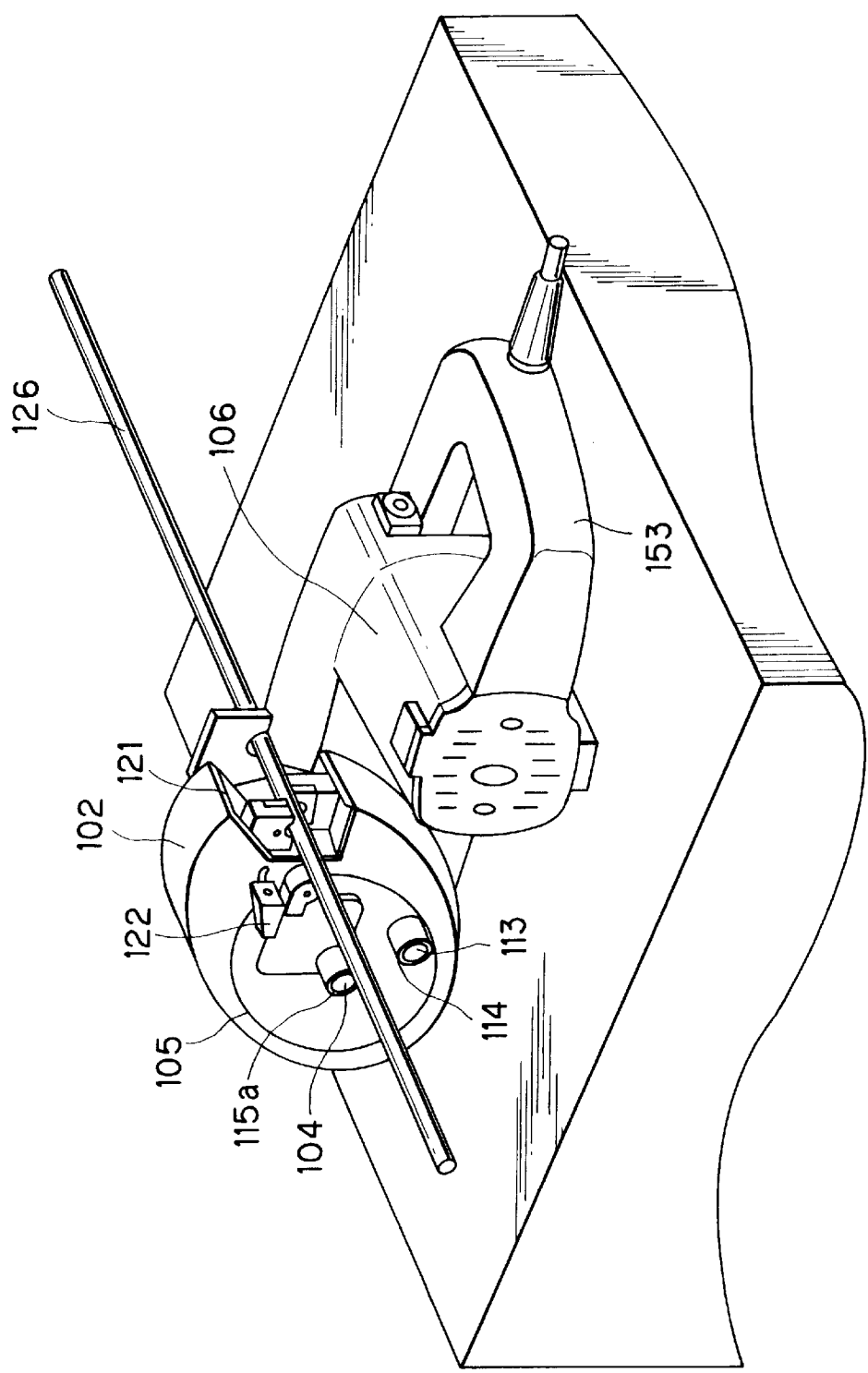
FIG. 32 is a perspective view showing the cutting and bending tool and showing its rod cutting state in the second embodiment.

In steel rod cutting operation, as shown in FIG. 32, the steel bar cutting and bending tool lies on a ground such that the output shaft 104 extends in a horizontal direction. With this posture, the movable blade 112B is positioned higher than the stationary blade 112A, and actual cutting spot is located at relatively higher position in respect to the gear cover 102.

Then, the blocking lever 122 is manually pivotally moved about the pivot shaft 109 in a counterclockwise direction in FIG. 23 from its open position (FIG. 24) to its blocking position (FIG. 23). As a result, the steel rod passage 115c is blocked by the wall portion 122c of the blocking lever 122, so that the steel rod 126 cannot be set on the steel rod passage 115c, and as a result, steel rod bending operation cannot be performed.

Upon manual pivotal movement of the blocking lever 122 in the counterclockwise direction, the projection 121c of the protection cover 121 is forcibly disengaged from the locking projection of the gear cover 102 with a suitable click sound because of the resilient deformation of the protection cover 121, and the protection cover 121 is pivotally moved in the counterclockwise direction about the pivot shaft 109 from a blade protecting position (FIG. 24) to a blade exposing position (FIG. 23). Thus, the protection cover 121 is retracted into the gear cover 102, and the movable and stationary blades 112B and 112A can be exposed to outside.

Then, the steel rod 126 is mounted on the semicircular blade edge of the stationary blade 112A. Because the cutting spot is located at an intermediate position between the bending mechanism portion BD and the power drive portion PD, the position of the steel rod 126 with respect to the stationary blade 112A is clearly visible by an operator from the handle side as indicated by an arrow A in FIG. 23. Therefore, accurate positioning of the steel rod 126 can be performed.

For cutting the steel rod 126, the heavy weight of the rod 126 is exerted on the blade 112A. Even if the heavy steel rod 126 is axially displaced on the stationary blade 112A for adjusting the cutting position of the rod 126, the steel rod cutting and bending tool can be maintained stationarily without shaking on the ground because the stationary blade 112A is located adjacent the center of gravity. The center of gravity of the tool is positioned close to the fixing member 108 positioned below the bending pin 113, and therefore, the cutting position is also positioned close to the center of gravity. Thus, stabilized cutting is achievable.

If the electrical cord 155 is connected to a power source, and the switch 154 is turned ON while gripping the handle 153, the electric motor 101 is rotated at high speed such as about 18000 r.p.m. The rotation of the rotation shaft 107a is decelerated to about 1/1000 by way of the gear train 103 including four stage spur gears and pinion gears 103a through 103g, and is transmitted to the output shaft 104. By the rotation of the output shaft 104, the cam 111 is angularly moved, so that the roller 160 in rolling contact with the cam 111 is pushed. Consequently, the pivot arm 110 is pivotally moved about the pivot shaft 109, so that the movable blade 112B is downwardly moved toward the stationary blade 112A.

The shearing force of the movable blade 112B is about 6000 Kg. In this case, a force of about 3000 kg is applied to the boundary between the cam 111 and the roller 160. Further, as shown in FIG. 25 a force F1 (about 3000 kg) is applied to the output shaft 104, and a force F2 (about 9000 kg) is applied to the pivot shaft 109. Therefore, force applied to the output shaft 104 and the pivot shaft 109 will generate a couple so that torsional force may be applied to the fixing member 108. However, as shown in FIG. 26, because the output shaft 104 and the pivot shaft 109 are supported by the fixing member 108 and the center plate 115, that is, both sides of the cam 111 and both sides of the pivot arm 110 are supported, the torsion force exerted to the fixing member 108 can be reduced by ½ or less in comparison with the first embodiment where the end portions of the output shaft and the pivot shaft are only supported by the fixing plate in a cantilevered fashion. Accordingly, the thickness of the fixing plate 108 can be reduced, and the diameter of the output shaft 104 can also be reduced yet providing a sufficient mechanical strength. As a result, a compact and light weight device results at low cost.

Figure 33:
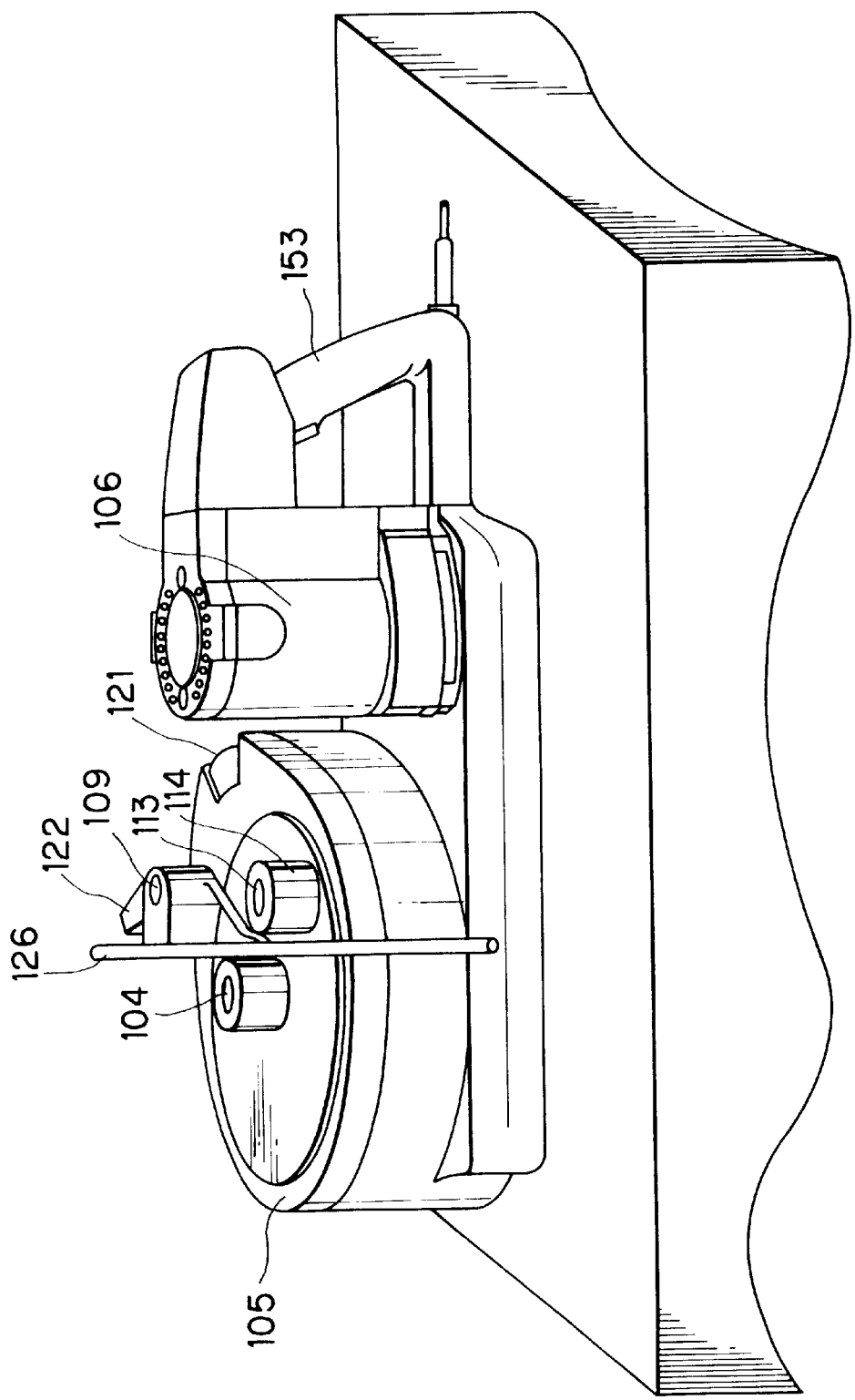
FIG. 33 is a perspective view showing the cutting and bending tool and showing its rod bending state in the second embodiment.
Figure 34:
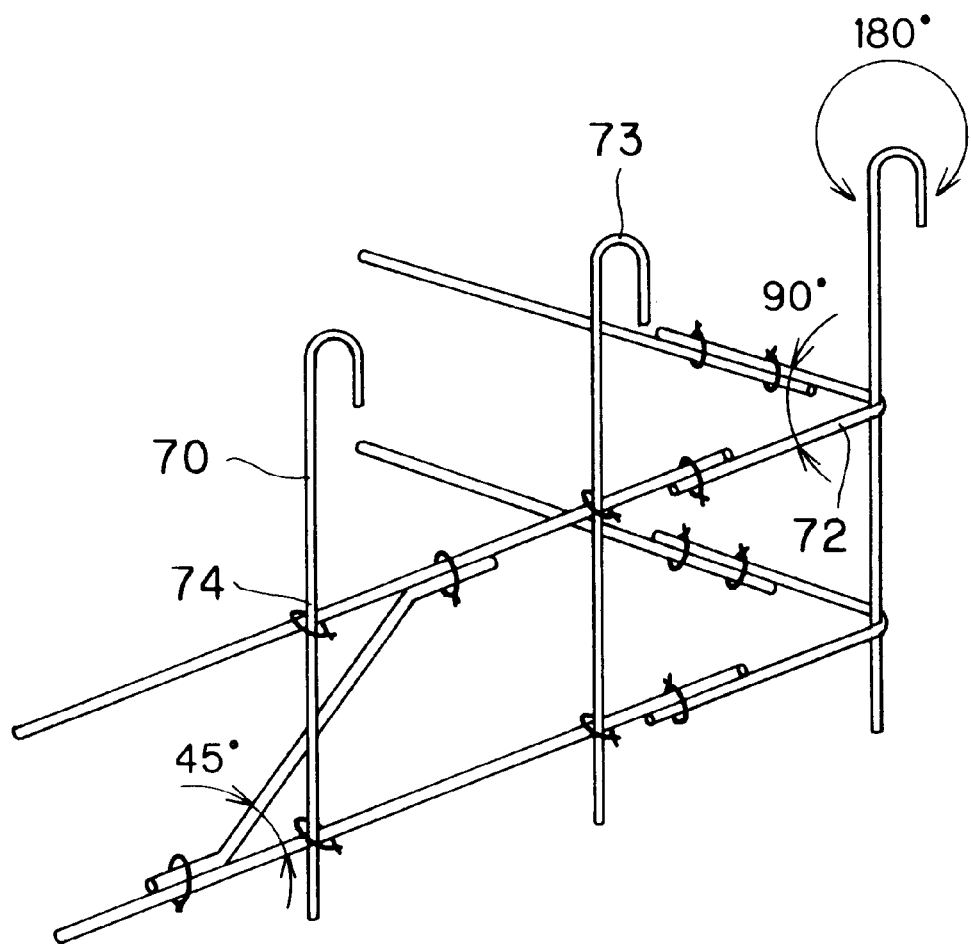
FIG. 34 is a perspective view showing an example for the use of reinforcing rods in the foundation or outer structure of a house or similar structure.

In the steel rod bending operation, the entire device is rotated by 90° from the posture shown in FIG. 32 to the posture shown in FIG. 33. Then, the blocking lever 122 is pivotally moved in a clockwise direction in FIG. 24 so as to provide an open space at the steel rod passage 115c. In accordance with the pivotal movement of the blocking lever 122, the protection cover 121 is interlockingly moved to its blade protecting position (FIG. 24). Consequently, during the rod bending operation, the blades 112A,112B do not bite any foreign objects. Further, because the projection 121c of the protection cover 121 is engaged with the locking projection 170, the protection cover 121 can surely be maintained at its blade covering position.

Figure 35:
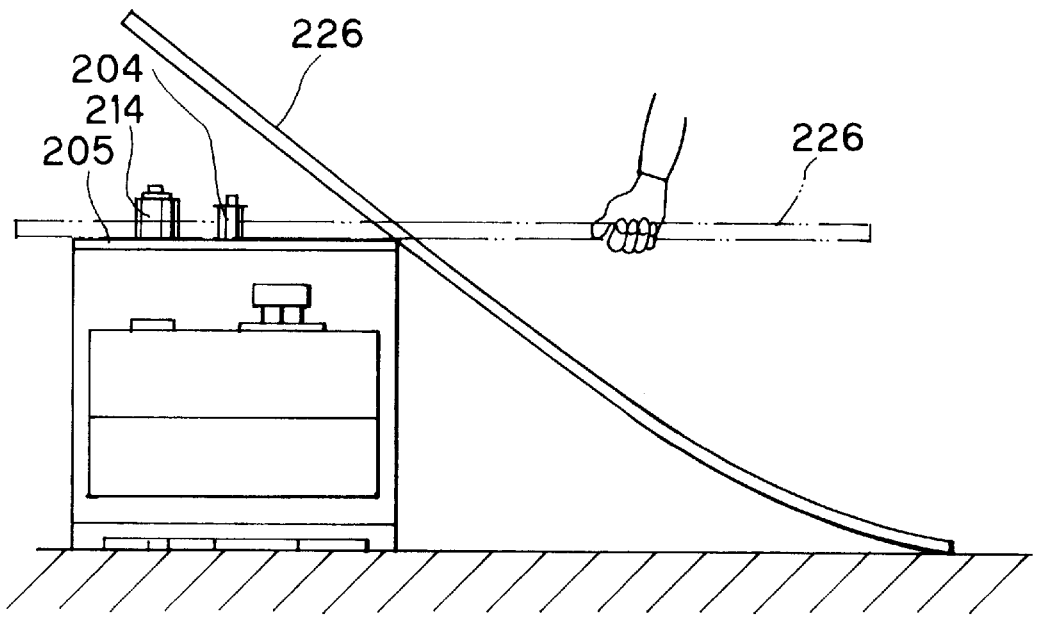
FIG. 35 is a side view showing a rod bending operation using a conventional electrical rod bending tool.
Figure 36:
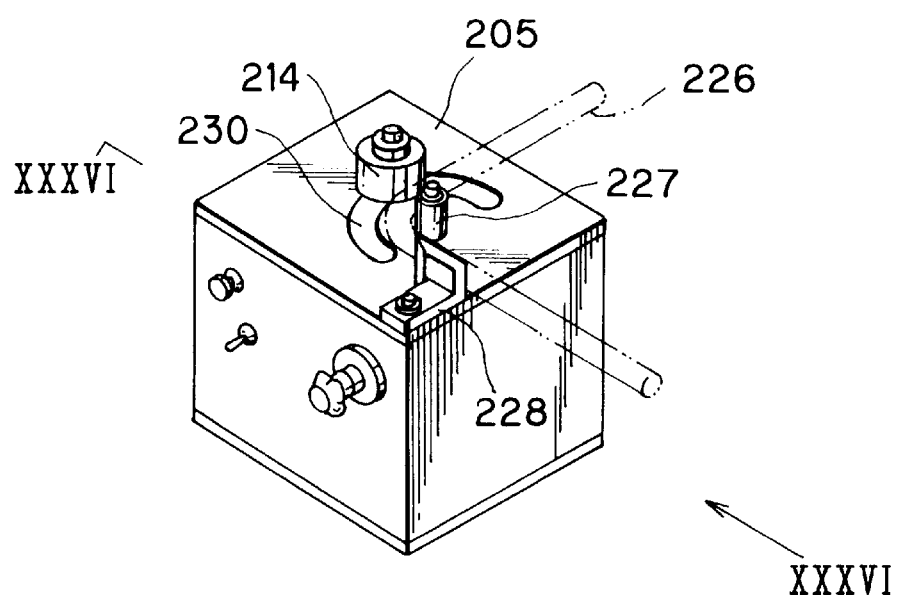
FIG. 36 is a perspective view showing a rod bending operation using another conventional electrical rod bending tool.
Figure 37:
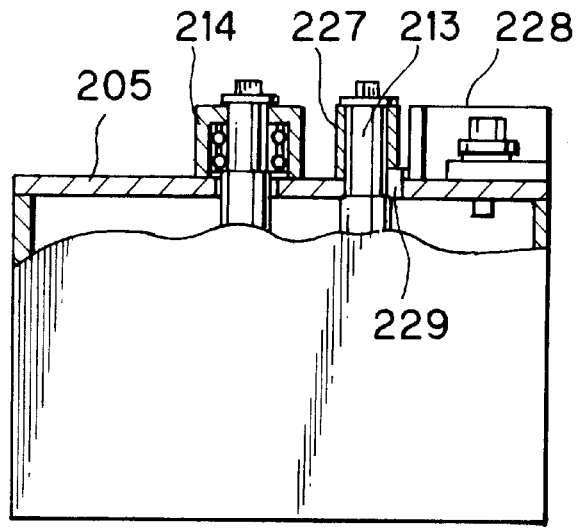
FIG. 37 is a cross-sectional view taken along the line XXXVI—XXXVI of FIG. 36.
Figure 38:
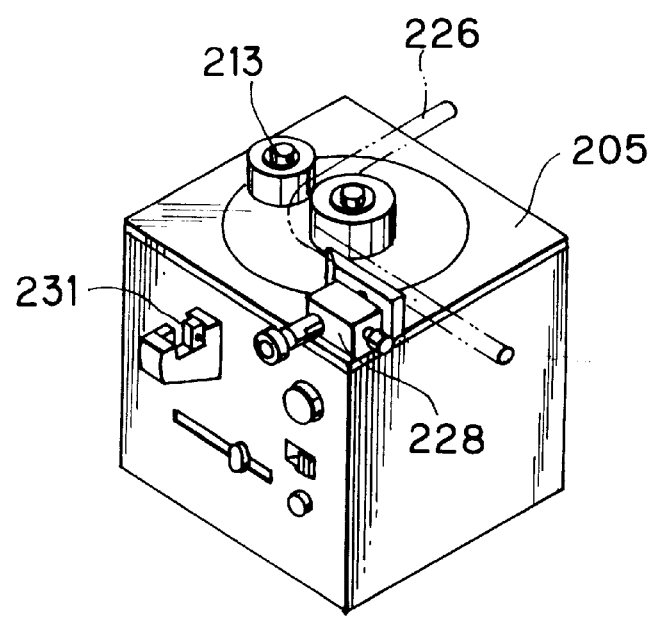
FIG. 38 is a perspective view showing a conventional rod cutting and bending tool.
Figure 39:
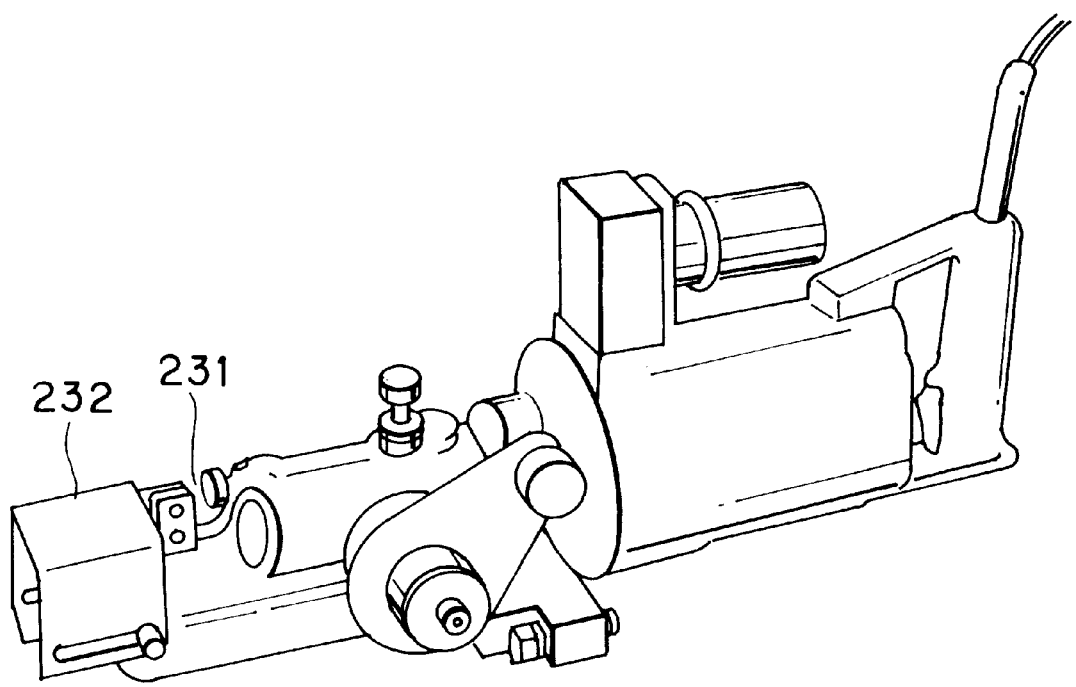
FIG. 39 is a perspective view showing a still another conventional rod cutting and bending tool.

Since the electric motor 101 is not disposed below the top plate 105, but is disposed beside the top plate 105 with the output shaft 104 and the rotation shaft 107a being in parallel to each other and with the power transmitting side of the rotation shaft 107a being at the lower end portion thereof, height of the top plate 105 can be reduced to about 120 mm, which may be the half height of the conventional device. If an elongated steel rod 126 is set at the steel rod passage 115c, the steel rod 126 is flexed because of the resiliency of the rod such that the rod portion positioned on the steel rod passage 115c is the highest and the remaining portion of the rod is gradually sloped down. However, since the top plate 105 is positioned at a low level, flexing curvature of the steel rod may be moderate. Accordingly, it is unnecessary to held a steel rod 126 at a position equal to the height of the device as in the conventional device shown in FIG. 35. Further, as shown in FIG. 24, since the steel rod passage 115c extends in a direction perpendicular to the line X connecting between the handle 153 and the electric motor 101, bending angle of the steel rod 126 around the sleeve member 115a can be easily acknowledged. For example, orthogonal or L-shaped bending of the rod 126 can be easily acknowledged with a simple eye measurement.

The steel rod 126 is held at a stable position by the sleeve member 115a and the wall of the rod supporting member 115b in the steel rod passage 115c. If the power switch 154 is rendered ON while setting the steel rod 126 on the steel rod passage 115c, the output shaft 104 is drivingly rotated in the manner similar to the cutting operation. By the rotation of the output shaft 104, the bending pin 113 provided to the cam 111 is moved in a direction indicated by an arrow B in FIG. 24 along the arcuate slot 105b, and further, the disc plate 119 is also rotated about the output shaft 104, because the bending pin 113 is connected to the disc plate 119.

In accordance with the movement of the bending pin 113, the bending roller 114 is brought into contact with the steel rod 126 and presses the steel rod 126. Therefore, the steel rod 126 is gradually bent at a torque of about 18 kgm toward a direction indicated by an arrow C about the central pin, i.e., the sleeve member 115a. Incidentally, the bending angle of the steel rod 126 is provisionally set by the dial (not shown). When the bending pin 113 reaches a preset position corresponding to the preset bending angle, the electric motor 101 is reversely rotated, and the bending pin 113 is moved to its original position.

During bending operation, the steel rod 126 held on the rod passage 115c is mounted on the rigid member, i.e., the center plate 115. Therefore, direct contact between the heavy steel rod 126 and the rotating disc member 119 is avoidable. Accordingly, the thickness of the disc plate 119 can be reduced without problem of frictional wearing of the disc plate 119. Thus, the entire weight of the device can be reduced.

The sleeve member 115a of the center plate 115 serves as a center pin, i.e., a fulcrum for bending the steel rod 126, and therefore, an extremely large load is exerted on the sleeve member 115a. However, the center plate 115 is supported by the rigid output shaft 104 and the rigid pivot shaft 109, and therefore, contrary to the conventional device, it is unnecessary to secure the center pin to the top plate. In this connection, a thin top plate is available, to provide a light weight device. Further, since the bending portion (sleeve member 115a) as well as steel bar supporting portion (steel bar supporting member 115b) and the steel bar mounting portion (steel bar passage 115c) are provided in the center plate 115, the number of mechanical components can be reduced and assembly can be facilitated.

Further, during the rod bending operation, a black membrane such as a scale and ferrous particles, those affixed to the surface of the steel rod 126, may be released therefrom and fall on the center plate 115, the disc plate 119 and the top plate 105. However, the felt sheet 120 is intimately interposed between the disc plate 119 and the top plate 105 without any gap or clearance in a range shown by dotted area D in FIG. 24. Therefore such foreign particles cannot be entered into the gear cover 102 through the arcuate slot 105b. Accordingly, since the cam 111 and the roller 160 are not involved with dust or foreign particles and are protected against galling.

Further, during the cutting or bending operation, if the ferrous particles and other foreign particles are entered into the electric motor 101, the commutator 107c and the carbon brush (not shown) may be frictionally worn at an early stage. However, in the second embodiment, the cooling air inlet port 106a is positioned at the top wall 106A of the housing 106, the top wall being positioned higher than the top plate 105 by 60 mm, and the scales dropped onto the top plate 105 during the bending operation may not be easily directed toward the cooling air inlet port 106a. Accordingly, prolonged service life of the electric motor 101 can be obtained.

Moreover, when suspending the steel bar cutting and bending tool by gripping the handle 153 for transportation thereof, the top plate 105 is at the lowest position, and the electric motor 101 and the handle 153 is positioned above the top plate 105. Accordingly, in carrying the cutting and bending tool, dusts or scales deposited on the top plate 105 do not enter into the housing 106, and the dust and scales do not fall down on the operator's hand gripping the handle. 153.

While the invention has been described in detail and with reference to the specific embodiment thereof, it would be apparent to those skilled in the art that various changes and modifications may be made therein without departing from the spirit and scope of the invention. For example, in the depicted embodiment, the steel bar cutting mechanism as well as steel bar bending mechanism is provided. However, the cutting mechanism can be omitted so that the resultant device can be exclusively used for steel bar bending tool. In this case, the pivot arm 21 and the cutting blades 24a and 24b are omitted, and the bending pin and roller should be provided at an eccentric position off-center of the output shaft 13. Alternatively, the bending mechanism can be omitted so that the resultant device can be exclusively used for steel bar cutter.

Further, in the first embodiment described above, the receiving pin 35 receiving the counteractive force of the reinforcing rod 70 during bending operation is made an independent part independent of the fixed member 19. However, instead of the receiving pin 35, the pivot shaft 20 can be used as a pin for receiving the counteractive force. That is, the pivot shaft 20 could be made to protrude from the cover 49 and that protruding portion could be used as the receiving pin. Such a construction would not only be simple to construct, but cost effective.

Further, in the illustrated embodiment, 13 mm reinforcing rods are used in the cutting and bending process, obviously the cutting and bending tool could be used for reinforcing rods with larger diameters, such as 16, 19, and 22 mm. The electric motor 1 and gear train 7-12 should be set optimally for the particular diameter.

Further, in the first embodiment, the spur gear train including the spur gears 8, 10 and 12 is disposed within the gear cover 14. However, instead of the spur gears, helical gears, bevel gears, and a planetary gear are available.

Further, in the first embodiment, the fixed cutting blade 24b protrudes from the gear cover 14 on the right side in FIG. 4. However, it is possible to invert the cam 18 and pivot arm 21 about a vertical axis to achieve a mirror image of the present embodiment. In this case, the fixed cutting blade 24b would protrude from the top left.

Further, the stand 51 in the first embodiment is formed of an iron bar. However, obviously the same effect would be achieved if the stand 51 were made of a bent iron plate or formed as a single piece with the housing 6 or the gear cover 14 using resin or aluminum die-casting, or if only feet protruded from the main body, allowing the tool to be placed horizontally or vertically.

Further, in the first embodiment, the spring clutch 15 is offered, but other clutches are available such as a claw clutch, ball clutch, friction plate clutch, and electromagnetic powder clutch as far as these can be turned ON and OFF by an electric signal.

Further, in the first embodiment, the bending roller 66 and receiving roller 36 are provided rotatably around the bending pin 16 and receiving pin 35, respectively, so as to minimize frictional forces between the reinforcing rod 70 and the pins 16 and 35 during bending process, to thus reduce so that the reinforcing rod 70 can be bent with a small torque. However, the same effect could be achieved by having rotatable rollers around the center pin 27 and the bending pin 16, but not around the receiving pin 35.

Further, in the second embodiment, the cam 111 is provided integrally with the output shaft 104. However, a separate cam can be fixedly connected to the output shaft 104.

Further, in the second embodiment, the center plate 115 having the sleeve member 115a, the rod supporting portion 115b, the steel rod passage 115c and the holes 115e and 115d are integrally formed by lost wax casting method. However, these parts can be formed separately and then connected together by welding or screw fixing.

Further, in the second embodiment, the felt sheet 120 is adhesively attached to the disc plate 119 in sliding contact with the top plate 105. However, the felt sheet can be adhesively attached to the top plate in sliding contact with the disc plate. Furthermore, instead of the felt sheet, a material providing high elastic deformation is available such as a rubber and a synthetic resin.

What is claimed is:

1. An electrically driven bar cutting and bending tool for selectively one of cutting and bending an elongated member, comprising:

a main body having an open end;

an electric motor housed in the main body;

a speed reduction gear train housed in the main body for deceleratingly transmitting rotation of the electric motor;

a fixing member fixed to the open end of the main body;

an output shaft rotatably supported by the fixing member and extending in the main body and connected to the speed reduction gear train, the output shaft having one end;

a cam provided on the output shaft and rotatable together with the rotation of the output shaft;

a pivot arm pivotally supported on the fixing member, the pivot arm having one end provided with a cam roller in contact with the cam, an intermediate portion provided with a pivot shaft fixed to the fixing member, and another end, the pivot arm being pivotally moved about an axis of the pivot shaft;

a movable blade provided at the other end of the pivot arm;

a stationary blade fixed to the fixing member at a position confrontable with the movable blade for cutting the elongated member;

a center pin coaxially provided at the one end of the output shaft; and a bending pin provided on the cam at a position away from the center pin so that the bending pin is moved about an axis of the center pin during rotation of the cam for bending the elongated member around the center pin.

2. The electrically driven bar cutting and bending tool as claimed in claim 1, wherein the cam has a rotation center and a cam surface, and comprises a fast-forward section in which a radius between the rotation center and the cam surface is rapidly increased, and a cutting section in which a radius between the rotation center and the cam surface is gradually increased.

3. The electrically driven bar cutting and bending tool as claimed in claim 2, further comprising a force receiving pin fixed to the fixing member at a position apart from the center pin for preventing the elongated member from being moved during movement of the bending pin in a bending direction.

4. The electrically driven bar cutting and bending tool as claimed in claim 2, wherein the cutting section of the cam comprises a plurality of arcs each having a radius different from one another for providing a wedge effect in connection with the cam roller to provide a power boosting ratio, and wherein the pivot arm provides a leverage ratio provided by a relationship between a first distance between the pivot shaft and the cam roller and a second distance between the pivot shaft and the movable blade, the combination of the power boosting ratio and the leverage ratio providing a first driving torque (Tc) of the output shaft during cutting operation and a second driving torque (Tb) of the output shaft during bending operation, the relationship between the first driving torque (Tc) and the second driving torque (Tb) being $0/67<Tc/Tb<1.5$.

5. The electrically driven bar cutting and bending tool as claimed in claim 2, wherein the cam further comprises a locking section lockingly engageable with the cam roller for preventing the output shaft from being rotated in one turn.

6. The electrically driven bar cutting and bending tool as claimed in claim 1, wherein the main body comprises:
   a housing for housing the electric motor;
   a gear cover positioned adjacent the housing and fixed to the housing for accommodating therein the speed reduction gear train;
   a cover member positioned adjacent the gear cover and fixed to the gear cover, a space being defined between the cover member and the gear cover for housing the fixing member, the pivot arm and the cam in the space; and
   the cutting and bending tool further comprising a handle having one end connected to the housing and another end connected to the gear cover; and a main switch retained in the handle for opening and closing an electrical power supply circuit to the electric motor.

7. The electrically driven bar cutting and bending tool as claimed in claim 6, wherein the main switch comprises a speed control switch having a trigger capable of changing an electrical power supply amount to the electric motor in accordance with a pulling amount of the trigger.

8. An electrically driven bar bending tool for bending an elongated member, comprising:
   a main body having an open end;
   an electric motor housed in the main body;
   a speed reduction gear train housed in the main body for deceleratingly transmitting rotation of the electric motor;
   a fixing member fixed to the open end of the main body;
   an output shaft rotatably supported by the fixing member and extending in the main body and connected to the speed reduction gear train, the output shaft having one end;
   a cam provided on the output shaft and rotatable together with the rotation of the output shaft, the cam bending the elongated member by rotation of the cam;
   a center pin coaxially provided at the one end of the output shaft; and
   a bending pin provided on the cam at a position away from the center pin so that the bending pin is moved about an axis of the center pin during the rotation of the cam for bending the elongated member around the center pin;
   wherein the main body comprises:
   a housing for housing the electric motor;
   a gear cover position adjacent the housing and fixed to the housing for accommodating therein the speed reduction gear train;
   a cover member positioned adjacent the gear cover and fixed to the gear cover, a space being defined between the cover member and the gear cover for housing the fixing member and the cam in the space; and
   the bending tool further comprising a handle having one end connected to the housing and another end connected to the gear cover; and a main switch retained in the handle for opening and closing an electrical power supply circuit to the electric motor.

9. The electrically driven bar bending tool as claimed in claim 8, wherein the cam has a rotation center and a cam surface, and comprises a fast-forward section in which a radius between the rotation center and the cam surface is rapidly increased, and a section in which a radius between the rotation center and the cam surface is gradually increased.

10. The electrically driven bar bending tool as claimed in claim 9, further comprising a force receiving pin fixed to the fixing member at a position apart from the center pin for preventing the elongated member from being moved during movement of the bending pin in a bending direction.

11. The electrically driven bar bending tool as claimed in claim 8, wherein the main switch comprises a speed control switch having a trigger capable of changing an electrical power supply amount to the electric motor in accordance with a pulling amount of the trigger for controlling bending speed of the elongated member.

12. An electrically driven bar bending tool for bending a bar comprising:
   an electric motor having a rotation shaft;
   a gear cover disposed adjacent said electric motor and having an upper open end;
   a speed reduction gear train connected to the rotation shaft and housed in the gear cover for decelerating rotation of the rotation shaft;
   a top plate positioned adjacent said gear cover, to cover the upper open end of the gear cover;
   an output shaft extending through the gear cover and connected to the speed reduction gear train;
   a center pin provided at a position above the top plate, the bar being bent around the center pin;
   a bending pin driven by the output shaft and having an upper portion extending though and projecting from the top plate, the bending pin being movable about the center pin, the bar being mounted on the top plate and bent by the movement of the bending pin around the center pin;
   a housing positioned adjacent the gear cover and top plate for exclusively housing the electric motor so as to reduce a height of the top plate, the rotation shaft having a lower end connected to the speed reduction gear train; and
   a fixing member fixed to an inside of the gear cover, the output shaft having an intermediate portion supported by the fixing member.

13. The bar bending tool as claimed in claim 12, wherein the output shaft has an upper end portion extending through and projecting from the top plate, the upper end portion serving as the center pin about which the bar is bent.

14. The bar bending tool as claimed in claim 12, wherein the top plate extends in a horizontal plane during bar bending operation, and wherein the housing has an upper end positioned higher than the top plate during the bar bending operation.

15. The bar bending tool as claimed in claim 14, wherein the upper end of the housing is formed with a cooling air inlet port.

16. The bar bending tool as claimed in claim 12, further comprising a handle attached to the housing at a position opposite the top plate with respect to the housing, the handle, the housing and the top plate being linearly arrayed.

17. The bar bending tool as claimed in claim 12, further comprising a cam provided on the output shaft, the bending pin being provided on the cam.

18. The bar bending tool as claimed in claim 12, wherein the speed reduction gear train comprises a plurality of spur gears, neighboring spur gears being alternately positioned in a vertical direction.

19. The bar bending tool as claimed in claim 12, further comprising a pivot shaft rotatably supported by the fixing member, the pivot shaft having an upper end portion extending through and projecting from the top plate for serving as a counteraction receiving member when the steel rod is bent around the center pin.

20. The bar bending tool as claimed in claim 19, further comprising a center plate having a first sleeve portion with which the upper end portion of the output shaft is rotatably fitted and a second sleeve portion into which the upper end portion of the pivot shaft is inserted, a rod extension passage being defined on the center plate and at a position between the first and second sleeve portions.

21. The bar bending tool as claimed in claim 19, wherein the top plate is formed with an arcuate slot, the upper portion of the bending pin extending through the slot and movable therealong, and further comprising
 a disc plate positioned above the top plate and covering the slot, the disc plate being provided rotatably in accordance with the movement of the bending pin.

22. The bar bending tool as claimed in claim 12, wherein a top surface of the housing is positioned in a higher horizontal plane than that of the top plate.

23. An electrically driven bar bending tool for bending a bar comprising:
 an electric motor having a rotation shaft;
 a gear cover having an upper open end;
 a speed reduction gear train connected to the rotation shaft and housed in the gear cover for decelerating rotation of the rotation shaft;
 a top plate positioned to cover the upper open end of the gear cover and is formed with a slot;
 an output shaft extending through the gear cover and connected to the speed reduction gear train;
 a center pin provided at a position above the top plate, the bar being bent around the center pin;
 a bending pin driven by the output shaft and having an upper portion extending through the slot and projecting from the top plate, the bending pin being movable about the center pin, the bar being mounted on the top plate and bent by the movement of the bending pin along the slot;
 a disc plate positioned above the top plate and covering the slot, the disc plate being provided rotatably in accordance with the movement of the bending pin; and an elastically deformable member interposed between the disc plate and the top plate for hermetically sealing the slot.

24. An electrically driven bar cutting and bending tool for one of selectively cutting a bar and bending the bar comprising:
 an electric motor having a rotation shaft;
 a gear cover having an upper open end;
 a speed reduction gear train connected to the rotation shaft and housed in the gear cover for decelerating rotation of the rotation shaft;
 a top plate positioned to cover the upper open end of the gear cover;
 an output shaft extending through the gear cover and connected to the speed reduction gear train;
 a cam rotatably driven by the output shaft;
 a center pin provided at a position above the top plate, the bar being bent around the center pin;
 a bending pin driven by the cam and having an upper portion extending through and projecting from the top plate, the bending pin being movable about the center pin, the bar being mounted on the top plate and bent by the movement of the bending pin around the center pin;
 a fixing member disposed in and fixed to the gear cover;
 a stationary blade fixed to the fixing member;
 a movable blade driven by the cam and movable toward and away from the stationary blade for cutting the bar; and
 a housing positioned adjacent the top plate for exclusively housing the electric motor, the rotation shaft having a lower end connected to the speed reduction gear train.

25. The bar cutting and bending tool as claimed in claim 24, further comprising a pivot arm pivotally movable in accordance with the rotation of the cam, the movable blade being fixed to the pivot arm.

26. The bar cutting and bending tool as claimed in claim 24, wherein a rod extending passage is formed at a position above the top plate, and further comprising;
 a protection cover movable between a protecting position for covering the movable and stationary blade and a exposing position for exposing the movable and stationary blade, and
 a blocking member movable between a blocking position for blocking the rod extending passage and an open position for opening the rod extending passage; and
 an interlocking mechanism for moving the protection cover to the protecting position when the blocking member is moved to the open position and for moving the protection cover to the exposing position when the blocking member is moved to the blocking position.

27. The bar cutting and bending tool as claimed in claim 24, wherein the movable blade and the stationary blade are positioned between the top plate and the housing.

28. An electrically driven bar cutting and bending tool for one of selectively cutting a bar and bending the bar comprising:
 an electric motor;
 a cutting portion comprising a stationary blade and movable blade movable toward and away from the stationary blade for cutting the bar, the movable blade being driven by the electric motor;
 a bending portion comprising a top plate, a center pin, and a bending pin, the top plate defining a rod extending passage on which the rod is installed for bending the rod, the center pin provided at the top plate, the bar being bent around the center pin, and the bending pin being driven by the electric motor and having an upper portion extending through and projecting from the top plate, the bending pin being movable about the center pin, and the rod extending passage being positioned between the center pin and the upper portion of the bending pin;

a protection cover movable between a protecting position for covering the cutting portion and a exposing position for exposing the cutting position;

a blocking member movable between a blocking position for blocking the rod extending passage and an open position for opening the rod extending passage; and an interlocking mechanism for moving the protection cover to the protecting position when the blocking member is moved to the open position and for moving the protection cover to the exposing position when the blocking member is moved to the blocking position.

* * * * *